US009790930B2

(12) United States Patent
Foshansky et al.

(10) Patent No.: US 9,790,930 B2
(45) Date of Patent: Oct. 17, 2017

(54) MEMORY ALLOY-ACTUATED APPARATUS

(71) Applicant: AUTOSPLICE, INC., San Diego, CA (US)

(72) Inventors: Leonid Foshansky, San Diego, CA (US); Robert Bogursky, Encinitas, CA (US)

(73) Assignee: AUTOSPLICE, INC., San Diego, CA (US)

( * ) Notice: Subject to any disclaimer, the term of this patent is extended or adjusted under 35 U.S.C. 154(b) by 264 days.

(21) Appl. No.: 14/671,823

(22) Filed: Mar. 27, 2015

(65) Prior Publication Data

US 2015/0267690 A1 Sep. 24, 2015

Related U.S. Application Data

(62) Division of application No. 13/662,210, filed on Oct. 26, 2012, now Pat. No. 9,206,789.

(60) Provisional application No. 61/551,739, filed on Oct. 26, 2011.

(51) Int. Cl.
*F03G 7/06* (2006.01)
(52) U.S. Cl.
CPC .................... *F03G 7/065* (2013.01)
(58) Field of Classification Search
CPC ....................................... F03G 7/065
USPC ............................ 60/527–529; 310/306–307
See application file for complete search history.

(56) References Cited

U.S. PATENT DOCUMENTS

| 2,209,233 | A | 7/1940 | Moyer |
| 2,854,648 | A | 9/1958 | Berg |
| 2,965,699 | A | 12/1960 | Bollmeier et al. |
| 2,983,898 | A | 5/1961 | Kalmar et al. |
| 3,038,341 | A | 6/1962 | Selig |
| 3,038,347 | A | 6/1962 | Sloan et al. |
| 3,438,407 | A | 4/1969 | Over |
| 3,464,227 | A | 9/1969 | Matthies |
| 3,465,962 | A | 9/1969 | Matulich et al. |
| 3,625,002 | A | 12/1971 | Davis |
| 3,879,981 | A | 4/1975 | Richards |
| 3,954,547 | A | 5/1976 | Genthner |
| 3,974,844 | A | 8/1976 | Pimentel |

(Continued)

FOREIGN PATENT DOCUMENTS

| CN | 1096365 A | 12/1994 |
| EP | 0785709 | 7/1997 |

(Continued)

*Primary Examiner* — Hoang Nguyen
(74) *Attorney, Agent, or Firm* — Gazdzinski & Associates, PC

(57) ABSTRACT

Improved actuator apparatus and methodologies for manufacturing and using the same. In one exemplary embodiment, the actuator apparatus includes an SMA filament that: (1) minimizes size and increases stroke length via a serpentine-like routing of the SMA filament within the device itself; (2) reduces power consumption as a result of a relatively flat stroke force as a function of stroke displacement operating profile; (3) enables the actuator assembly to remain in a fully actuated state, at a consistent stroke force, for longer periods of time; and (4) is also fully reversible so as to be capable of use in both push-based and pull-based actuator applications. Methods of operation and manufacturing associated with the aforementioned actuator apparatus are also disclosed.

20 Claims, 16 Drawing Sheets

(56) References Cited

U.S. PATENT DOCUMENTS

| | | | |
|---|---|---|---|
| 4,043,174 | A | 8/1977 | Paolino |
| 4,372,486 | A | 2/1983 | Tomioka et al. |
| 4,448,147 | A | 5/1984 | Dewaegheneire |
| 4,484,725 | A | 11/1984 | Yoshiga |
| 4,551,974 | A | 11/1985 | Yaeger |
| 4,806,815 | A | 2/1989 | Honma et al. |
| 4,819,682 | A | 4/1989 | Van Marcke |
| 4,945,727 | A | 8/1990 | Whitehead et al. |
| 5,020,601 | A | 6/1991 | Retzloff et al. |
| 5,039,061 | A | 8/1991 | Heard et al. |
| 5,129,753 | A * | 7/1992 | Wesley .................. B64G 1/222 403/322.3 |
| 5,166,832 | A * | 11/1992 | Zychowicz ............ B60R 1/074 248/479 |
| 5,169,117 | A | 12/1992 | Huang |
| 5,211,371 | A | 5/1993 | Coffee |
| 5,259,554 | A | 11/1993 | Ewing et al. |
| 5,312,152 | A | 5/1994 | Woebkenberg, Jr. et al. |
| 5,397,053 | A | 3/1995 | Ewing et al. |
| 5,440,193 | A | 8/1995 | Barrett |
| 5,486,653 | A | 1/1996 | Dohi |
| 5,563,466 | A | 10/1996 | Rennex et al. |
| 5,684,448 | A | 11/1997 | Jacobsen et al. |
| 5,685,148 | A * | 11/1997 | Robert .................... F03G 7/065 60/527 |
| 5,758,863 | A | 6/1998 | Buffet et al. |
| 5,763,976 | A | 6/1998 | Huard |
| 5,763,979 | A | 6/1998 | Mukherjee et al. |
| 5,816,306 | A | 10/1998 | Giacomel |
| 5,865,418 | A | 2/1999 | Nakayama et al. |
| 5,870,007 | A | 2/1999 | Carr et al. |
| 5,984,258 | A | 11/1999 | Knebel et al. |
| 6,004,171 | A | 12/1999 | Ito et al. |
| 6,056,605 | A | 5/2000 | Nguyen et al. |
| 6,073,904 | A | 6/2000 | Diller et al. |
| 6,232,555 | B1 | 5/2001 | Besler et al. |
| 6,236,300 | B1 | 5/2001 | Minners |
| 6,247,678 | B1 | 6/2001 | Hines et al. |
| 6,279,869 | B1 | 8/2001 | Olewicz |
| 6,305,662 | B1 | 10/2001 | Parsons et al. |
| 6,326,707 | B1 * | 12/2001 | Gummin ................ F03G 7/065 310/12.13 |
| 6,374,608 | B1 | 4/2002 | Corris et al. |
| 6,379,393 | B1 | 4/2002 | Mavroidis et al. |
| 6,425,829 | B1 | 7/2002 | Julien |
| 6,574,958 | B1 | 6/2003 | MacGregor |
| 6,739,574 | B1 | 5/2004 | Simon |
| 6,742,761 | B2 | 6/2004 | Johnson et al. |
| 6,749,457 | B2 | 6/2004 | Sakaguchi et al. |
| 6,799,990 | B2 | 10/2004 | Wendling et al. |
| 6,832,477 | B2 | 12/2004 | Gummin et al. |
| 6,840,257 | B2 | 1/2005 | Dario et al. |
| 6,843,465 | B1 | 1/2005 | Scott |
| 6,843,466 | B1 | 1/2005 | Chuang |
| 6,870,007 | B2 | 3/2005 | Uesaka |
| 6,893,274 | B2 | 5/2005 | Chen et al. |
| 6,959,904 | B2 | 11/2005 | Beraldo |
| 7,055,793 | B2 | 6/2006 | Biehl et al. |
| 7,093,817 | B2 | 8/2006 | MacGregor et al. |
| 7,331,563 | B2 | 2/2008 | Biehl et al. |
| 7,347,221 | B2 | 3/2008 | Berger et al. |
| 7,506,663 | B2 | 3/2009 | Thomas et al. |
| 7,555,900 | B1 | 7/2009 | Vallance et al. |
| 7,624,768 | B2 | 12/2009 | Neet et al. |
| 7,650,914 | B2 | 1/2010 | Bogursky et al. |
| 7,926,520 | B2 | 4/2011 | Bogursky et al. |
| 8,113,243 | B2 | 2/2012 | Bogursky et al. |
| 8,127,543 | B2 * | 3/2012 | Von Behrens .......... F03G 7/065 60/527 |
| 8,376,184 | B2 | 2/2013 | Buchstab et al. |
| 8,540,206 | B2 | 9/2013 | Foshansky et al. |
| 8,615,929 | B2 | 12/2013 | Lee et al. |
| 9,206,789 | B2 * | 12/2015 | Foshansky .............. F03G 7/065 |
| 2002/0171055 | A1 | 11/2002 | Johnson et al. |
| 2002/0185932 | A1 | 12/2002 | Gummin et al. |
| 2004/0256920 | A1 | 12/2004 | Gummin et al. |
| 2005/0005980 | A1 | 1/2005 | Eberhardt et al. |
| 2005/0006980 | A1 | 1/2005 | Horst |
| 2005/0150223 | A1 | 7/2005 | Rey et al. |
| 2005/0172462 | A1 | 8/2005 | Rudduck et al. |
| 2005/0229670 | A1 | 10/2005 | Perreault |
| 2005/0273020 | A1 | 12/2005 | Whittaker et al. |
| 2005/0273059 | A1 | 12/2005 | Mernoe et al. |
| 2005/0282444 | A1 | 12/2005 | Irish et al. |
| 2006/0043208 | A1 | 3/2006 | Graham |
| 2006/0052664 | A1 * | 3/2006 | Julian .................... A61B 1/0053 600/146 |
| 2006/0091342 | A1 | 5/2006 | Butera et al. |
| 2007/0068721 | A1 * | 3/2007 | Browne .................. B60R 21/38 180/274 |
| 2007/0114968 | A1 | 5/2007 | Krah et al. |
| 2007/0277877 | A1 | 12/2007 | Ghorbal et al. |
| 2007/0294873 | A1 | 12/2007 | Bogursky |
| 2008/0173833 | A1 | 7/2008 | Vyawahare et al. |
| 2009/0301573 | A1 | 12/2009 | Harrington et al. |
| 2010/0021311 | A1 | 1/2010 | McNally et al. |
| 2010/0097223 | A1 * | 4/2010 | Kruest ................ E05B 47/0009 340/572.1 |
| 2010/0108922 | A1 | 5/2010 | Foshansky et al. |
| 2011/0024653 | A1 | 2/2011 | Huber et al. |
| 2011/0088387 | A1 | 4/2011 | Von Behrens et al. |
| 2011/0175474 | A1 | 7/2011 | Brown et al. |
| 2012/0104292 | A1 | 5/2012 | Kollar et al. |
| 2012/0151913 | A1 | 6/2012 | Foshansky |
| 2012/0153043 | A1 | 6/2012 | Arekar et al. |
| 2012/0160334 | A1 | 6/2012 | Deperraz et al. |
| 2013/0091772 | A1 | 4/2013 | Berger et al. |
| 2013/0111896 | A1 | 5/2013 | Foshansky et al. |

FOREIGN PATENT DOCUMENTS

| | | |
|---|---|---|
| EP | 1610418 | 12/2005 |
| EP | 2239486 A1 | 10/2010 |
| GB | 1045380 | 10/1966 |

* cited by examiner

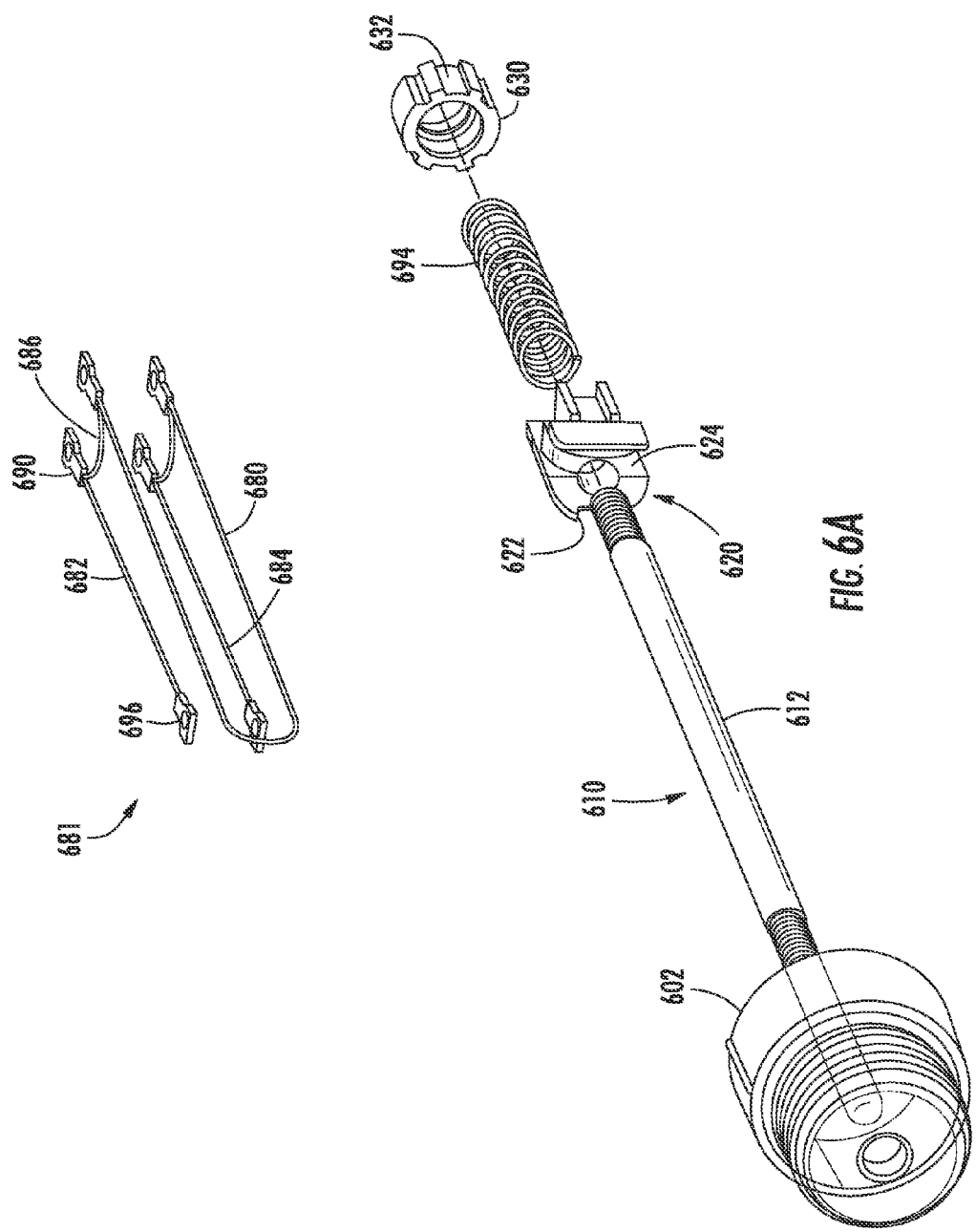

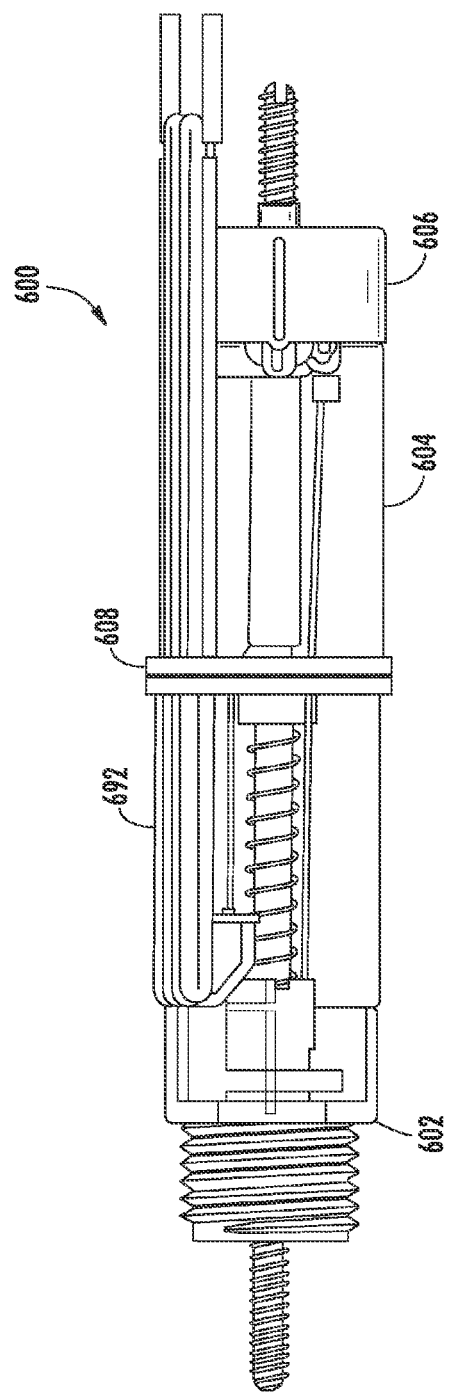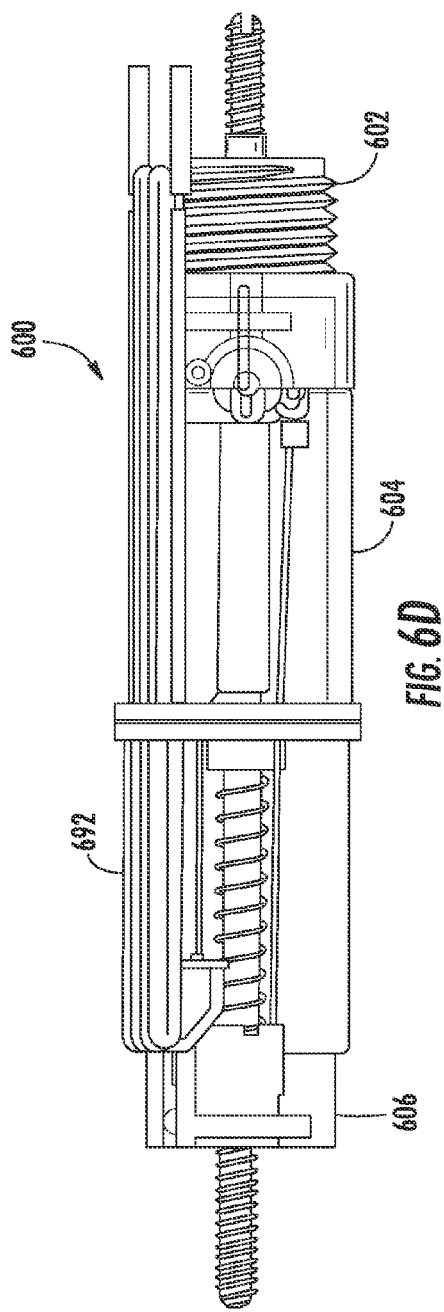
FIG. 6C
FIG. 6D

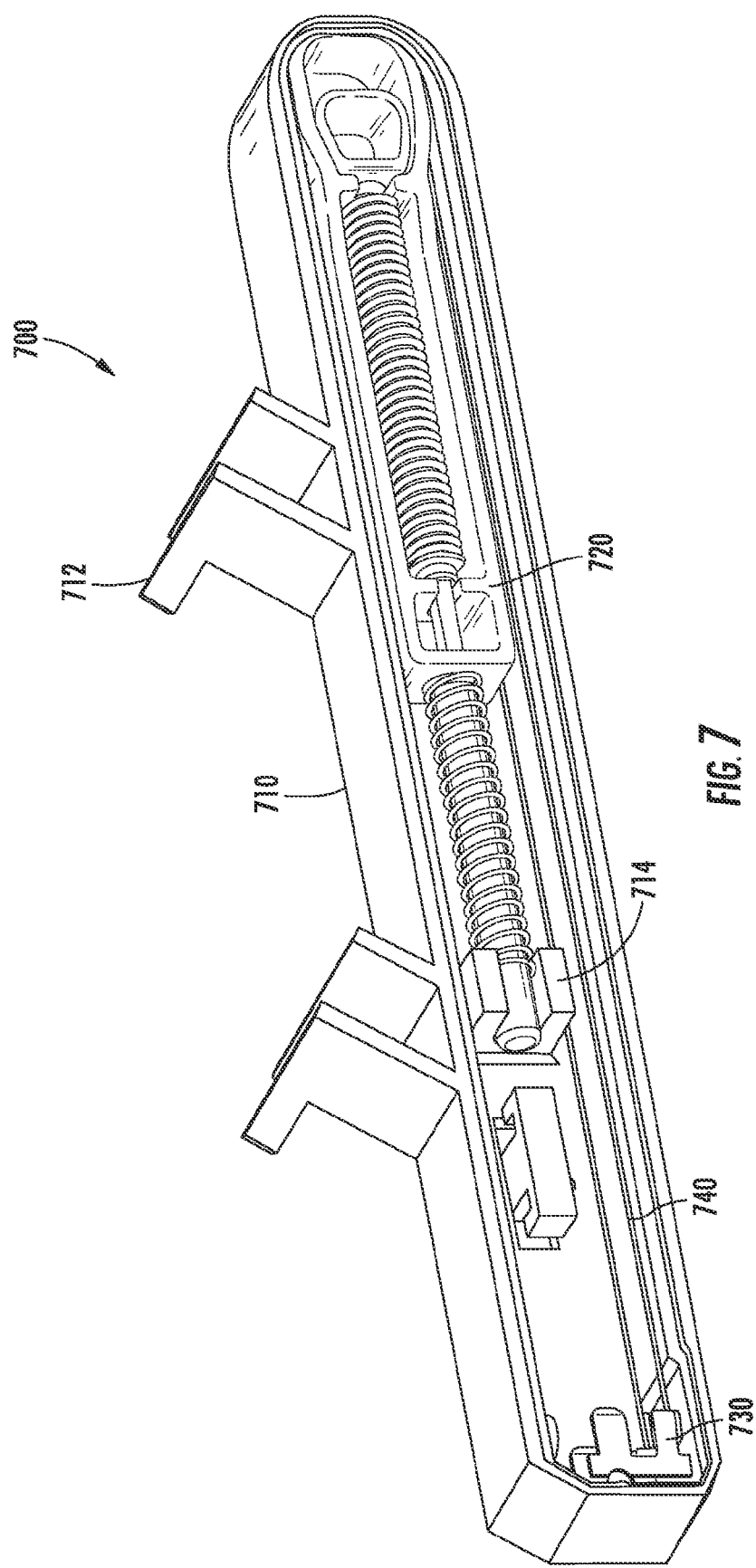

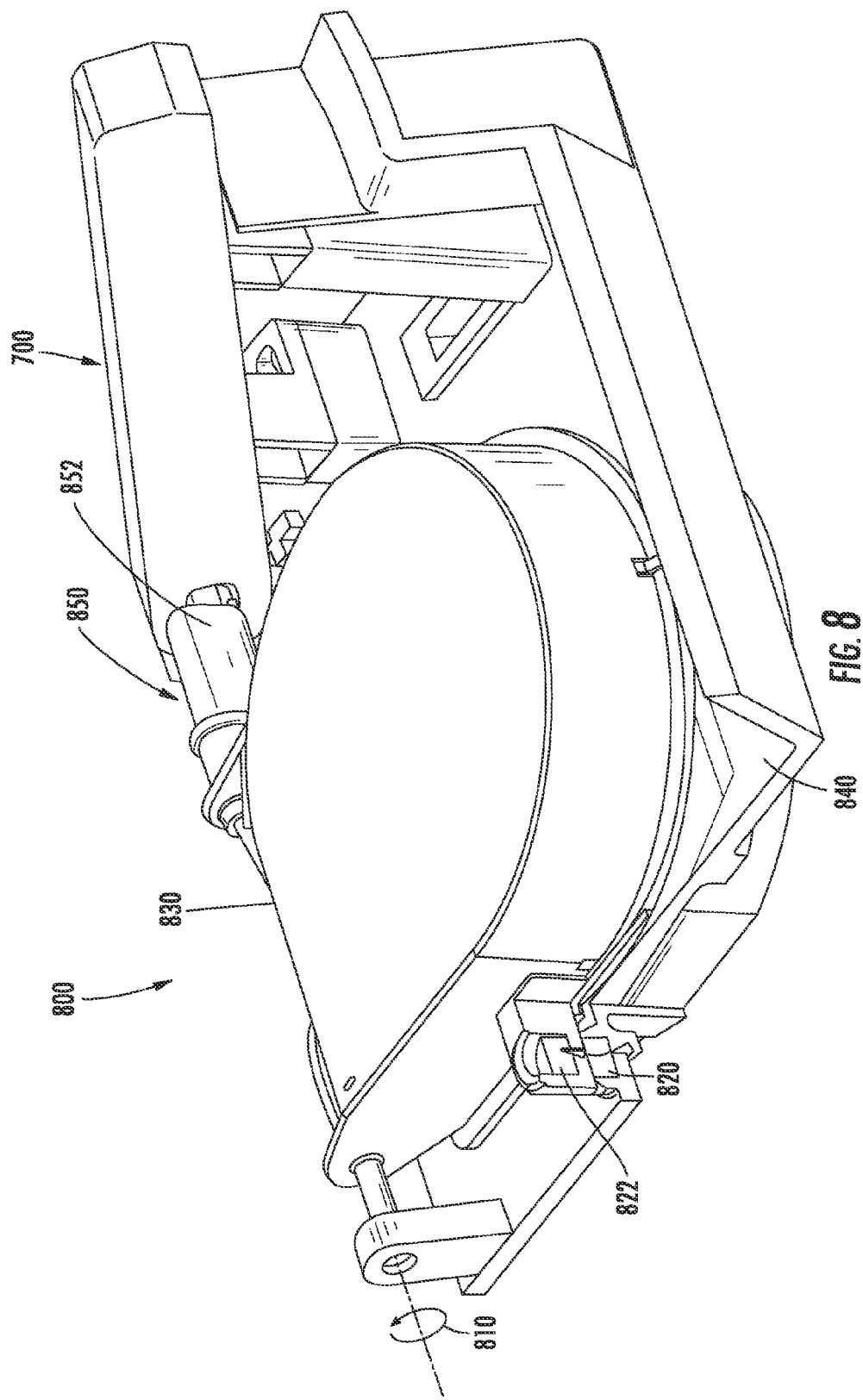

MEMORY ALLOY-ACTUATED APPARATUS

PRIORITY AND RELATED APPLICATIONS

This application is a divisional of and claims priority to co-owned and co-pending U.S. patent application Ser. No. 13/662,210 filed Oct. 26, 2012 and entitled "Memory Alloy-Actuated Apparatus and Methods for Making and Using the same", which claims the benefit of priority to U.S. Provisional Patent Application Ser. No. 61/551,739 filed Oct. 26, 2011 of the same title, each of the foregoing being incorporated herein by reference in their entirety.

This application is also related to co-owned and co-pending U.S. patent application Ser. No. 12/539,521 filed Aug. 11, 2009 and entitled "Multi-Stable Actuation Apparatus and Methods for Making and Using the Same" which claims priority to U.S. provisional patent application Ser. No. 61/189,148 filed Aug. 14, 2008 of the same title and to U.S. provisional patent application Ser. No. 61/206,883 filed Feb. 4, 2009 and entitled "Memory Alloy-Actuated Apparatus and Methods for Making and Using the Same", each of the foregoing being incorporated herein by reference in its entirety. This application is also related to co-owned and co-pending U.S. patent application Ser. No. 13/149,508 filed May 31, 2011 and entitled "Power-Efficient Actuator Assemblies and Methods of Manufacture" which claims priority to U.S. provisional patent application Ser. No. 61/423,181 filed Dec. 15, 2010 of the same title, each of which is incorporated herein by reference in its entirety. Furthermore, this application is related to co-owned and co-pending U.S. patent application Ser. No. 12/969,143 filed Dec. 15, 2010 and entitled "Memory Alloy-Actuated Apparatus and Methods for Making and Using the Same", the contents of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. TECHNOLOGICAL FIELD

The present disclosure relates generally to the area of actuators and actuation, and more specifically in one exemplary aspect, to an improved design for and methods of manufacturing and using an actuator apparatus which is actuated by a shape memory alloy (SMA) material.

2. DESCRIPTION OF RELATED TECHNOLOGY

Actuator assemblies are well known in a variety of industries, including such common applications such as door locks, car vents, irrigation systems, and industrial applications, as well as in common household appliances that include, without limitation, refrigerators, dishwashers and washing machines. One common prior art apparatus for actuator-induced movement is commonly known as a solenoid. A solenoid is a device that converts energy (e.g. electrical current, fluid pressure, etc.) into a linear actuation. An electromechanical solenoid typically comprises electrically conductive windings that are wrapped around a magnetic core. The windings produce a magnetic field when an electrical current is passed through it, thereby inducing the magnetic core to move. An actuator rod or other linkage element is coupled to the magnet, thereby actuating a parent device. Other types of "solenoids" also exist in the prior art and include devices such as pneumatic and hydraulic solenoids.

Numerous examples of solenoid actuators exist in the prior art. For example, U.S. Pat. No. 7,347,221 to Berger, et al. issued Mar. 25, 2008 and entitled "SOLENOID VALVE" discloses a valve assembly comprising two valves and a single solenoid actuator with only one magnetizing coil that controls both valves.

A common limitation with regards to electromechanical solenoids (particularly those that are used in small or portable consumer applications) is the fact that the actuating current is often generated via a series of batteries. Such batteries are often arranged in a series configuration, thereby adding the voltage of each cell while maintaining a common current through each. These solenoid actuators generally have comparatively large power requirements, and are often inefficient due to, inter alia, the internal resistance associated with the application of an electric current across the solenoid coils.

Furthermore, the reliability of prior art solenoid actuators is dependent upon each of the batteries in the aforementioned "series" power source delivering constant power; if any one of the batteries falters, the solenoid actuator cannot function since the current path is broken (i.e., the "dead" cell will not conduct).

In addition, electromechanical solenoids typically do not output a constant applied force as a function of actuation distance. In fact, it is well known that an electromechanical solenoids actuation or stroke force decreases significantly over the length of the actuation. This is problematic, particularly in low power applications, in that electromechanical solenoid designs are generally "over-designed" for much of the actuating stroke length of the solenoid, i.e. more stroke force then is necessary is present throughout much of the stroke length of the solenoid, thereby decreasing the efficiency of the device.

Electromechanical solenoids also are not particularly well suited for holding the actuator in an actuated state for long periods of time, as electrical current must be constantly applied. Many deleterious side effects result from holding an electromechanical solenoid in an actuated state for long periods of time, such as overheating, decreased stroke force as a function of time, and even electromechanical solenoid failure.

Despite the wide variety of actuation approaches and configurations in the prior art, there remains an unsatisfied need for improved actuator apparatus that: (i) provides a more constant force throughout the stroke length of the actuator, (ii) reduces overall power requirements for operation, (iii) reduces power necessary for linear movement initiated by the actuator, (iv) reduces internal resistance and Ohmic power losses, and/or (v) maximizes stroke length as a function of actuator size. Ideally, such improved actuator apparatus would also address an unsatisfied need relating to so-called "green" technologies that enable the utilization of other green technologies (such as solar power), as well as reduce the volume of hazardous waste deposited in landfills by e.g., minimizing or eliminating the disposal of batteries that contain toxic metals such as lead, mercury and cadmium.

SUMMARY

The aforementioned needs are satisfied herein by providing improved shape memory alloy (SMA) actuator assemblies, as well as methods for making and using the same.

In a first aspect, SMA actuator assemblies are disclosed. In one embodiment, the SMA actuator assembly includes one or more SMA filaments, the one or more SMA filaments being electrically coupled with respective ones of a plurality of terminals; a driver element configured to move when power is applied to at least one of the one or more SMA filaments; and a pivot assembly, which in combination with the one or more SMA filaments, is configured to actuate the driver element.

In a first variant, the SMA actuator assembly further includes a chassis, the plurality of terminals and the pivot assembly configured to be received within the chassis.

In another variant, the SMA actuator assembly further includes a shaft, the shaft being configured to be received within the driver element.

In yet another variant, the SMA actuator assembly further includes a compression spring, the compression spring configured to return the driver element into a non-actuated position when power is removed from the one or more SMA filaments.

In yet another variant, the SMA actuator assembly pivot assembly further includes: a trunnion configured to act as a pivot point for one or more pivot shuttles; and at least a portion of the one or more SMA filaments is configured to be coupled to the trunnion via the one or more pivot shuttles.

In yet another variant, the SMA actuator assembly the shaft is configured to freely move through an aperture located in the trunnion.

In yet another variant, the SMA actuator assembly includes a housing assembly configured to house the one or more SMA filaments, the driver element, the pivot assembly and the chassis.

In yet another variant, the SMA actuator assembly housing assembly includes a body portion and one or more end cap portions.

In yet another variant, the SMA actuator assembly, the one or more end cap portions are configured to be positioned on either end of the body portion, thereby facilitating the configuration of the SMA actuator assembly from a pull-based configuration to a push-based configuration.

In a second embodiment, the SMA actuator assembly includes a plurality of SMA filaments, the SMA filaments being electrically coupled with respective ones of a plurality of terminals; a pivot assembly, which in combination with the plurality of SMA filaments, is configured to actuate a driver element; and a chassis configured to house the pivot assembly therein, the pivot assembly configured to rotate within the chassis.

In a first variant, the driver element is further comprises a guide feature configured to facilitate lateral movement along the chassis.

In an alternative variant, the driver element further includes a routing channel configured to route at least one of the plurality of SMA filaments around a portion of the driver element.

In yet another variant, the plurality of SMA filaments includes a loop filament, an upper filament, a lower filament and one or more jumper filaments.

In yet another variant, the at least one of the plurality of SMA filaments routed around the portion of the driver element includes the loop filament.

In yet another variant, ends associated with the one or more jumper elements are configured to be coupled to the pivot assembly.

In yet another variant, the upper filament and the lower filament each have two ends associated therewith, with one end of the respective upper or lower filament being coupled to the pivot assembly and with the other end of the respective upper or lower filament being coupled to a respective terminal of the plurality of terminals.

In a third embodiment, the SMA actuator assembly includes: one or more SMA filaments, the one or more SMA filaments being electrically coupled with respective ones of a plurality of terminals; a pivot assembly, which in combination with the one or more SMA filaments, is configured to actuate a driver element; and a chassis configured to house the pivot assembly therein, the pivot assembly configured to rotate in either of two directions within the chassis.

In a first variant, the SMA actuator assembly further includes a rod coupled with the driver element, the rod further configured to be received within an aperture located on the pivot assembly.

In another variant, the SMA actuator assembly further includes a compression spring; and a spacer element; with the compression spring being disposed between the spacer element and an end portion of the chassis.

In yet another variant, the compression spring is further configured to return the driver element into a non-actuated position when power is removed from the one or more SMA filaments.

BRIEF DESCRIPTION OF THE DRAWINGS

The features, objectives, and advantages of the disclosure will become more apparent from the detailed description set forth below when taken in conjunction with the drawings, wherein:

FIG. 6A is a perspective exploded view of the SMA filament assembly and driver element portion of the actuator assembly illustrated in FIG. 6;

FIG. 6C is a top view of the actuator assembly of FIG. 6, disposed in a pulling configuration;

FIG. 6D is a top view of the actuator assembly of FIG. 6, disposed in a pushing configuration;

FIG. 7 is a perspective view of another embodiment of an actuator assembly having an SMA filament protection feature, in accordance with the disclosure;

FIG. 8 is a perspective view of an exemplary ice dispenser apparatus for a refrigerator that utilizes the actuator assembly of FIG. 7;

Reference is now made to the drawings wherein like numerals refer to like parts throughout.

DETAILED DESCRIPTION

Figure 1:
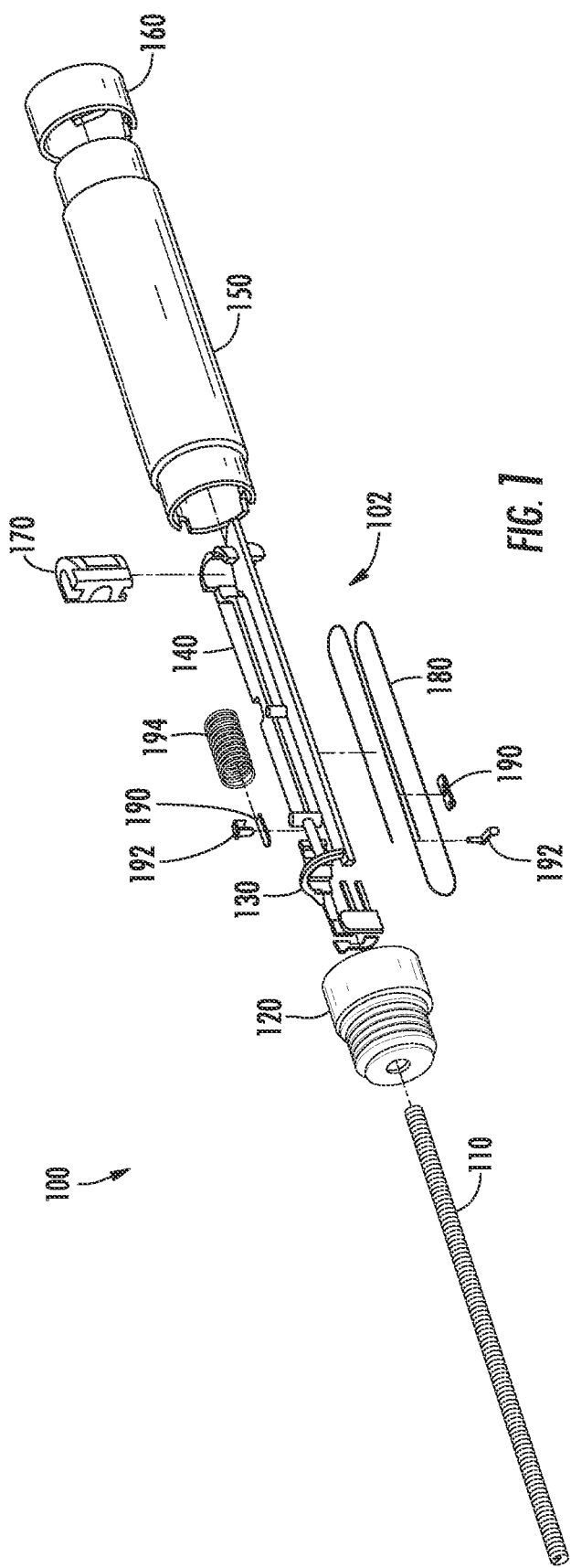
FIG. 1 is a perspective exploded view of an exemplary actuator assembly in accordance with the principles of the present disclosure.

As used herein, the term "filament" refers to any substantially elongate body, form, strand, or collection of the foregoing, including without limitation drawn, extruded or stranded wires or fibers, whether metallic or otherwise.

As used herein, the term "shape memory alloy" or "SMA" shall be understood to include, but not be limited to, any metal that is capable of "remembering" or substantially reassuming a previous geometry. For example, after it is deformed, it can either substantially regain its original geometry by itself during e.g., heating (i.e., the "one-way effect") or, at higher ambient temperatures, simply during unloading (so-called "pseudo-elasticity"). Some examples of shape memory alloys include nickel-titanium ("NiTi" or "Nitinol") alloys and copper-zinc-aluminum alloys.

Overview

In one aspect, the present disclosure provides an actuator apparatus having many advantages with respect to common prior art approaches, such as those previously described herein. In one exemplary embodiment, the actuator apparatus of the disclosure includes an SMA filament that minimizes size and increases stroke length via a serpentine-like routing of the filament within the device. In this manner, the stroke length of the actuator can be increased without necessarily requiring an overall increase in size for the actuator assembly itself.

In another exemplary aspect of the disclosure, the power consumption necessary to operate the actuator assembly is minimized, and reduced over prior art approaches. This is accomplished in one embodiment via the use of an SMA filament having an operating profile with a relatively flat stroke force as a function of stroke displacement. Contrast this feature with typical prior art electromechanical solenoid implementations, in which stroke force drops off precipitously as a function of stroke distance, thereby requiring designers of these prior art electromechanical solenoids to design for worst case operating scenarios (thereby unnecessarily adding complexity and/or weight/bulk to the design). Accordingly, an SMA actuator assembly configured in accordance with the present disclosure does not need to be "over-designed" throughout much of the stroke length, as was often the case in prior art implementations. This advantageously reduces, inter alia, the overall power consumption of the actuator assembly, thereby enabling wider use of actuator assemblies in portable applications in which power consumption is a significant design consideration, or in instances where relatively low power alternative power sources (e.g. photovoltaics) are used to drive the actuator assembly.

In addition to possessing a flatter stroke force vs. stroke displacement operating profile, embodiments of the present disclosure also enable the actuator assembly to remain in a fully actuated state, at a consistent stroke force, for appreciably longer periods of time, as compared with prior art actuator techniques.

In another exemplary embodiment, the actuator assembly of the disclosure is also fully reversible. Such a design enables the actuator to be used in push-based and pull-based actuator applications, while minimizing or eliminating the need to use customized actuator components, as well as eliminating the need for separate inventory management, part numbers, etc.

Filament protection apparatus embodiments are also disclosed which protect, for example, SMA filaments from being damaged or broken when the underlying actuator apparatus becomes jammed or where movement of the actuator is otherwise prevented. In one variant, the protection apparatus allows the filament to move, even in instances where the overall actuator apparatus can not move.

In another aspect, SMA actuator apparatus that includes a steel/magnet button combination is disclosed. Such an SMA actuator provides advantages over prior art configurations which utilized a torsion spring, for example, to keep a lid closed over the body of an ice dispenser apparatus. Such a configuration is desirable, as the force exerted by a steel/magnet button combination quickly dissipates as the two actuation force of the SMA filament only needs to be strong enough to break the initial magnetic coupling force. By lowering the amount of force necessary for the SMA filament to actuate the lid, less stress is seen on the SMA filament, which increases product life.

SMA rod actuator apparatus is also disclosed, which in one embodiment includes a mechanism that not only allows for increased mechanical leverage, but also simultaneously allows for increased stroke length in applications such as refrigerator vents.

Methods of operation and manufacturing associated with the aforementioned actuator apparatus are also disclosed.

Exemplary Embodiments

Exemplary embodiments of the apparatus and methods of the present disclosure are now described in detail with respect to FIGS. 1-10. It will be appreciated that while described primarily in the context of an actuator used to replace electro-mechanical actuators (e.g., electromechanical solenoids utilized in automobile door locks, household appliances, etc.), the disclosure is in no way limited to such applications, and may be applied to literally any application requiring actuator-induced movement of one or more components.

Moreover, it will be appreciated that while the various embodiments shown and described herein are described with respect to certain directions or magnitudes (e.g., upward, downward, left right, higher, lower, etc.), these directions and magnitudes are merely exemplary and relative in nature, and not in any way a requirement in practicing the disclosure. For instance, a device which utilizes an "upward" force in one embodiment could simply be inverted, thereby utilizing a "downward" force just as easily.

Shaped Memory Alloy—

Shaped memory alloy (SMA) generally consists of a metal that is capable of "remembering" or substantially reassuming a previous geometry or physical condition. For example, after it is deformed, it can either substantially regain its original geometry by itself during e.g., heating (i.e., the "one-way effect") or, at higher ambient temperatures, simply during unloading (so-called "pseudo-elasticity"). Some examples of shape memory alloys include nickel-titanium ("NiTi" or "Nitinol") alloys and copper-zinc-aluminum alloys.

Actuator Assembly—

Referring now to FIG. 1, an exemplary embodiment of an actuator assembly 100 is shown and described in detail. As illustrated, the actuator 100 comprises a tubular body 150, with the tubular body 150 encasing various elements of the actuator assembly 100 as described subsequently herein. These encased elements generally comprise what is known as the chassis assembly 102. The tubular body 150, in combination with the interchangeable threaded cap 120 and non-threaded cap 160, act in concert to protect the internal components of the assembly which ultimately provide the desired actuator-induced movement. The internal components that make up the chassis assembly include the driver element 130 along with the chassis 140, which in combination with the filament wire 180 are utilized to actuate the threaded shaft 110. In addition, an internal spring 194 is used to aid in returning the actuator assembly to its original state prior to actuation via the filament wire 180.

In the illustrated embodiment, the actuator assembly 100 also includes a trunnion element 170 which facilitates the movement of the driver 130 by acting as a pivot point within the chassis 140 for the movement of the filament wire 180, as will be described in more detail subsequently herein.

The actuating movement of the threaded shaft is driven directly by the driver element 130 which is slidably coupled to the chassis 140. The driver element is in turn coupled to the wire filament 180. In one exemplary embodiment, the filament wire 180 is adapted to, upon thermal activation, change physical shape. This is accomplished via the use of a shape memory alloy (SMA) material for the filaments.

As previously noted, SMA alloys include for instance nickel-titanium ("NiTi" or "Nitinol") alloys or copper-zinc-aluminum alloys. Depending on the type of material used, the SMA filaments used in the illustrated embodiments may have varying degrees of "memory". For example, in one variant, heating of a filament will cause its length to contract by a prescribed amount (e.g., 4% to 5% of total original length), but cooling back to its original temperature does not cause the filament to regain all of its original length, due to imperfect realignment within the material at the molecular/atomic level. Rather, a tensile stress must be applied to allow the material to regain its full original length, which is accomplished by way of a spring 194. Such alloys are well known to those of ordinary skill, and accordingly are not described further herein.

As illustrated, the filament 180 is placed within the assembly in such a way that the resultant change in shape (i.e., during thermal activation) causes a force to be applied to the driver element 130. This force, in turn, causes the driver element 130 to slide along a guide rail present within the chassis so as to change from a first position to a second position. These alternating positions for the driver element 130 actuate the rod 110 within the tubular body, resulting in at least two distinct states for the assembly (i.e., "actuated" and "non-actuated"). As a result of the physical properties of the SMA filament, the application of force to the driver element is relatively easy to maintain so long as thermal energy remains applied to the filament. This provides a distinct advantage over prior art electromechanical solenoid devices, which lose actuating force over time when kept in an actuated state.

When and while thermal energy is applied, the exemplary SMA filaments reduce themselves in length or contract. The application of thermal energy may be achieved in any number of known ways, including the application of a relatively small current through the filament, thereby heating the filament and altering its shape (length). Heat may be applied from an external source via conduction, convection, or even radiation as well.

The distance traveled by the driver element 130 during filament heating is referred to as "stroke", "stroke length" or "stroke distance", and the force associated with the movement or stroke is termed the "stroke force". Due to the relatively limited size of the tubular body 150, and the space available in many applications which can utilize the actuator assembly 100 illustrated, the filament 180 is positioned about the chassis 140 in a serpentine-like or doubled over shape. This shape permits the length of the filament 180 to be substantially greater without increasing the overall length of the actuator assembly 100, thereby increasing the stroke of the actuator assembly 100 significantly within the same form factor. For example, if the SMA filament were only to pass a single length of the tubular body so that the total length was, for example, one (1) inch in length, at a 4% length variation in an energized state, the total stroke for the filament would only be forty (40) mils, or forty-thousands of an inch (0.040 in.). Contrast this result with the design illustrated in FIG. 1 in which four (4) passes of the tubular body are made (resulting in a total length of approximately four inches in the present example), thus substantially increasing the total stroke to one-hundred sixty thousandths of an inch (0.160 in.). Increasing the stroke length is desirable, in that the increased total stroke permits a wider array of actuator end applications for the actuator assembly 100, and also provides increased margin for error/failure (i.e., the actuator is less likely to fail or not actuate under a given failure or wear condition).

In the illustrated embodiment of FIG. 1, the securing mechanisms 190 of the filament are located on the same side of the actuator assembly chassis 140. In an embodiment, the securing mechanisms 190 comprise crimp terminals specifically adapted for use with SMA filament, such as those described in co-owned U.S. Pat. No. 7,650,914 filed Jun. 22, 2006 and entitled "Apparatus & Methods for Filament Bonding & Manufacturing", the contents of which are incorporated herein by reference in its entirety. Disposed in electrical communication in the illustrated embodiment are electrical terminals 192 which are connected with a power source. In an exemplary implementation, the power source is a direct current (DC) power source such as a battery or a common photovoltaic (e.g. a solar cell). While primarily contemplated with the use of a DC power source, it is appreciated that an alternating current (AC) power source could also be used (e.g., with a rectifier circuit or the like). In addition, in some applications, it may be desirable to use a conductive, convective, or radiative heat source to induce actuation (e.g., as in the case of an actuator for a fire sprinkler system that is actuated by ambient convective and radiation heat from a fire, etc.). Other circuits for use in powering the actuator assembly 100 of FIG. 1 include for example those described in co-owned and co-pending U.S. patent application Ser. No. 13/149,508 filed May 31, 2011 and entitled "Power-Efficient Actuator Assemblies and Methods of Manufacture", the contents of which were previously incorporated herein by reference in its entirety. The stroke force of the filament 180 as the filament 180 changes shape (i.e., between de-energized and energized states) is used to pull and/or push the driver element 130 which is directly coupled to the threaded rod 110.

The trunnion element 170 illustrated in FIG. 1 acts as a pivot point for the filament as it expands and contracts. The trunnion 170 sits in a correspondingly sized feature resident within the chassis 140. As the filament 180 is heated, the total length of the filament will shorten. The filament 180, which is wrapped around the periphery of the trunnion, causes the trunnion to angularly rotate about its axis to compensate for the shortening of the filament. The trunnion element 170 thus advantageously acts to relieve the stresses applied to the filament at this pivot point by minimizing abrasive stresses. Accordingly, use of a trunnion element extends the cycle life of the actuator assembly, and makes the assembly more robust and reliable in operation (due to, inter alia, reduced friction which may prematurely wear or even sever the filament).

In an alternative embodiment, the trunnion element can be obviated in favor of a stationary post. Use of a stationary post can be utilized where the need for a more robust anti-wear mechanism in the actuator assembly 100 does not exist (e.g., in applications which are only required by design to be actuated one or a limited number of times), or where the design otherwise needs to be simplified by reducing the number of moving components such as for space, weight, and/or cost considerations. Preferably, the stationary post in such cases will be smooth (e.g., highly polished), coated, lubricated, or otherwise made from a low friction material such as Teflon® or the like. Conversely, the filament itself may be coated, lubricated, polished, etc. in addition to or in pace of the post, consistent with maintaining its desirable physical qualities and behavior under heating.

It is also appreciated that the SMA filaments may be of varied or uniform thickness. The thickness of SMA filaments is determinative of the force associated with the filament's change in length, and with the length of time (latency) and amount of energy necessary to cause the change in the filament's length. Therefore, it is appreciated that a plurality of configurations having different numbers and/or diameter of filaments 180 may be utilized consistent with the present disclosure to provide various desirable effects. For instance, in one variant, a plurality of small filaments disposed substantially in parallel are used to provide both low latency and high pull force, since (i) the forces of each individual filament are essentially additive, and (ii) the latency with each individual filament is low due to its small diameter. This advantageously provides the same level of force that a larger filament would, but without the greater latency associated therewith. However, such an arrangement requires an increase in electrical current over that for a single filament, since each individual filament must be actuated.

In another variant, a number of different filaments with different thicknesses are used in parallel, thereby giving a distribution of force and latency. In contrast to the variant previously described wherein all filaments are of the same thickness, this latter variant results in the force applied by the filament being distributed over time, since each filament will contract (assuming the same start time for the application of current) over a different period of time, and with a different force level. The time and/or level of applied current can also be adjusted so as to create the desired force/time profile.

Stranded filaments (e.g., rope-lay pattern or the like) may also be used consistent with the disclosure.

Figure 2:
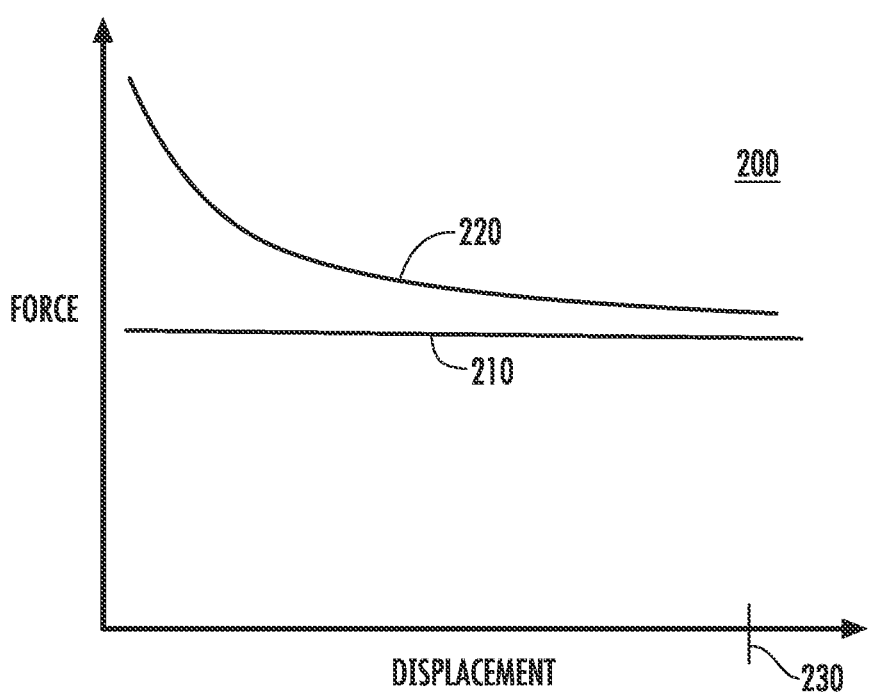
FIG. 2 is a plot of force as a function of actuating displacement for both an actuator assembly in accordance with an exemplary embodiment of the present disclosure, and a prior art electromechanical solenoid actuator.

Referring now to FIG. 2, one salient advantage of the SMA filament in the actuator assembly of FIG. 1 over prior art electromechanical solenoids is illustrated using a plot of applied force as a function of displacement. More specifically, the plot 200 illustrated in FIG. 2 shows applied force as a function of displacement distance for both the actuator assembly of FIG. 1, and a comparable prior art electromechanical solenoid. As can be seen, the SMA actuator provides for a highly linear and constant stroke force throughout the entire stroke of the actuator, as indicated by the plot line 210. Compare the highly linear and constant stroke force of the SMA actuator assembly with the plot line 220 of a typical electromechanical solenoid, the latter in which the stroke force diminishes as a function of stroke distance. As can be seen, the applied force of the electromechanical solenoid drops precipitously as a function of displacement when a current is applied. As a result, electromechanical solenoids typically are overdesigned throughout much of the stroke of the actuator (i.e., between the non-actuated distance and the full stroke distance 230). In other words, for an electromechanical solenoid to apply an equivalent amount a stroke force at the full stroke distance 230 as an SMA actuator, the electromechanical solenoid has to apply much more stroke force than is otherwise necessary throughout the remaining portion of the stroke distance. This "overdesign" of stroke force in other portions of the range or motion is typically accomplished by increasing electrical current flow to the solenoid coil (thereby increasing the generated magnetic field), which results in higher $I^2R$ losses, heat generation, and wasted energy. Accordingly, the use of SMA actuators allows for the minimization of an applied current to the SMA actuator assembly as applied current results in a constant stroke force throughout the stroke of the SMA actuator.

Figure 3:
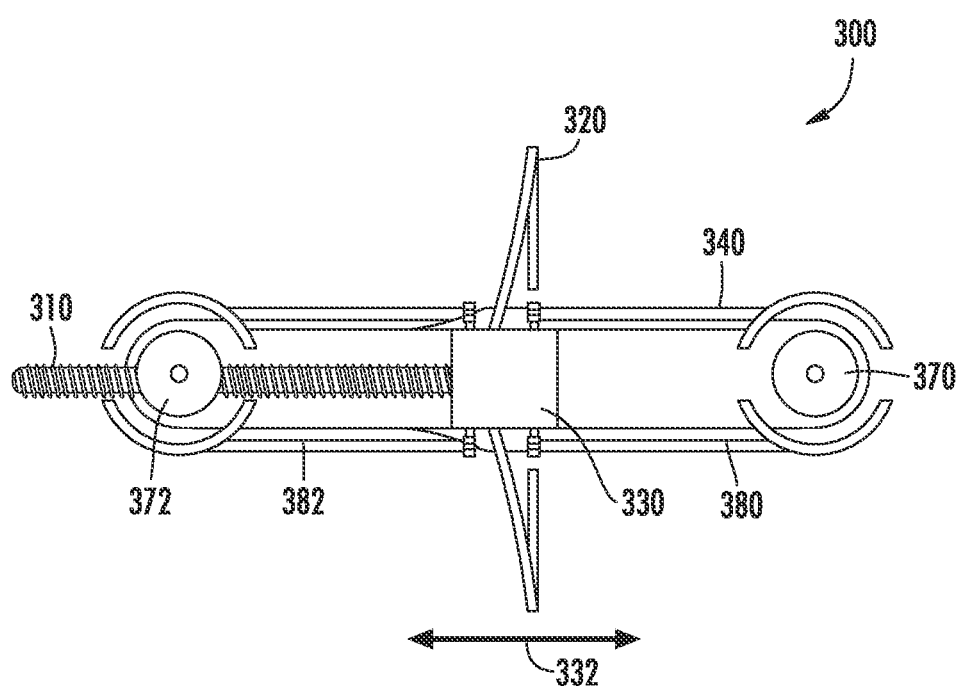
FIG. 3 is a top elevation view of a chassis assembly for use with, for example, the actuator assembly housing of FIG. 1, in which a bistable diaphragm is used.

Referring now to FIG. 3, an alternative embodiment of an SMA actuator 300 is shown, in which a current does not need to be applied to the SMA filament in order for the threaded rod 310 to remain in an actuated state. This is accomplished in part via the use of a bi-stable diaphragm 320 such as that described in co-owned and co-pending U.S. patent application Ser. No. 12/539,521 filed Aug. 11, 2009 and entitled "Multi-Stable Actuation Apparatus and Methods for Making and Using the Same", which claims priority to U.S. provisional patent application Ser. No. 61/189,148 filed Aug. 14, 2008 of the same title and to U.S. provisional patent application Ser. No. 61/206,883 filed Feb. 4, 2009 and entitled "Memory Alloy-Actuated Apparatus and Methods for Making and Using the Same", the contents of each being incorporated herein by reference in its entirety. In order to accomplish the functionality provided by the bi-stable diaphragm, the SMA actuator frame 340 accommodates at least two (2) distinct SMA wires 380, 382 each coupled to the driver element 330 and routed around respective trunnion elements 370, 372. Pulling SMA filament 380 applies a pulling force along an axis 332 to the threaded actuator rod 310 when a current is applied, while the pushing SMA filament 382 applies a pushing force along axis 332 to the threaded actuator rod 310 when a current is applied. The bi-stable diaphragm accordingly permits the threaded rod to remain in an actuated state upon completion of the application of current to the respective SMA filaments, with a subsequent application of current on an opposing SMA filament needed in order for the device to change states. Such a configuration is particularly advantageous in applications that require the actuator to remain in a prolonged actuated state, and/or where the overall power consumed by the SMA actuator needs to be minimized.

Figure 4:
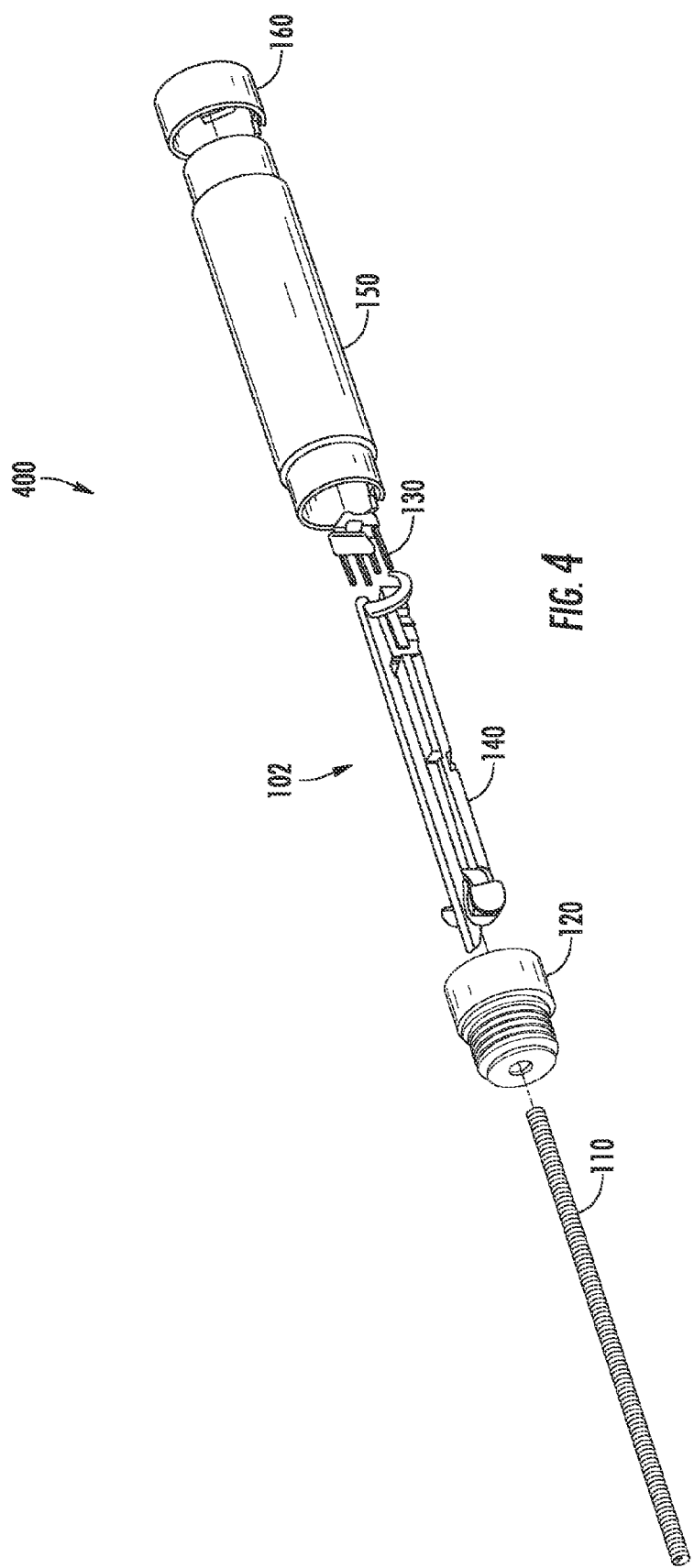
FIG. 4 is a perspective exploded view of the exemplary actuator assembly of FIG. 1 with the chassis assembly reversed, in accordance with another embodiment of the present disclosure.

FIG. 4 illustrates yet another advantage of the illustrated actuator assembly 100 of FIG. 1, namely its reversible nature. The reversed actuator assembly 400 includes all of the same features illustrated and discussed with regards to FIG. 1 (i.e., the actuator assembly components of FIG. 1 are included in the reversed actuator assembly 400 of FIG. 4), and also applies an identical stroke force in either configuration when the identical components are used. The only difference is that the chassis assembly 102 which includes the chassis 140, the driver element 130 and all the associated components used therewith, is reversed within the tubular body 150 such that the SMA filament, when actuated, pushes the threaded rod 110 from the threaded end cap 120. Contrast this with the embodiment illustrated in FIG. 1 in which the SMA filament, when actuated, pulls the threaded rod into the threaded end cap 120. In this manner, the actuator assembly illustrated in FIG. 1 is reversible without requiring any additional specialized components for the reversed assembly 400. Hence, the illustrated actuator assembly can be implemented as either a push-based (expanding) or pull-based (contracting) actuator while utilizing all of the same components, thereby taking advantage of inter alia economies of scale when manufacturing, stocking, and distributing the components for both the pull-based and push-based SMA actuators.

While the ability to reuse components for both the push and pull-based actuators is considered an exemplary feature of the illustrated embodiments of FIGS. 1 and 4, it is recognized that various components could be readily substituted and be uniquely utilized for either of the push or pull-based actuators. For example, the threaded rod 110 might differ in its length dimension depending on whether it is used in a push or pull-based application. These, and other implementation specific details, would be readily apparent to one of ordinary skill given the present disclosure. These advantages are further exemplified in the embodiment illustrated in FIG. 5.

Figure 5:
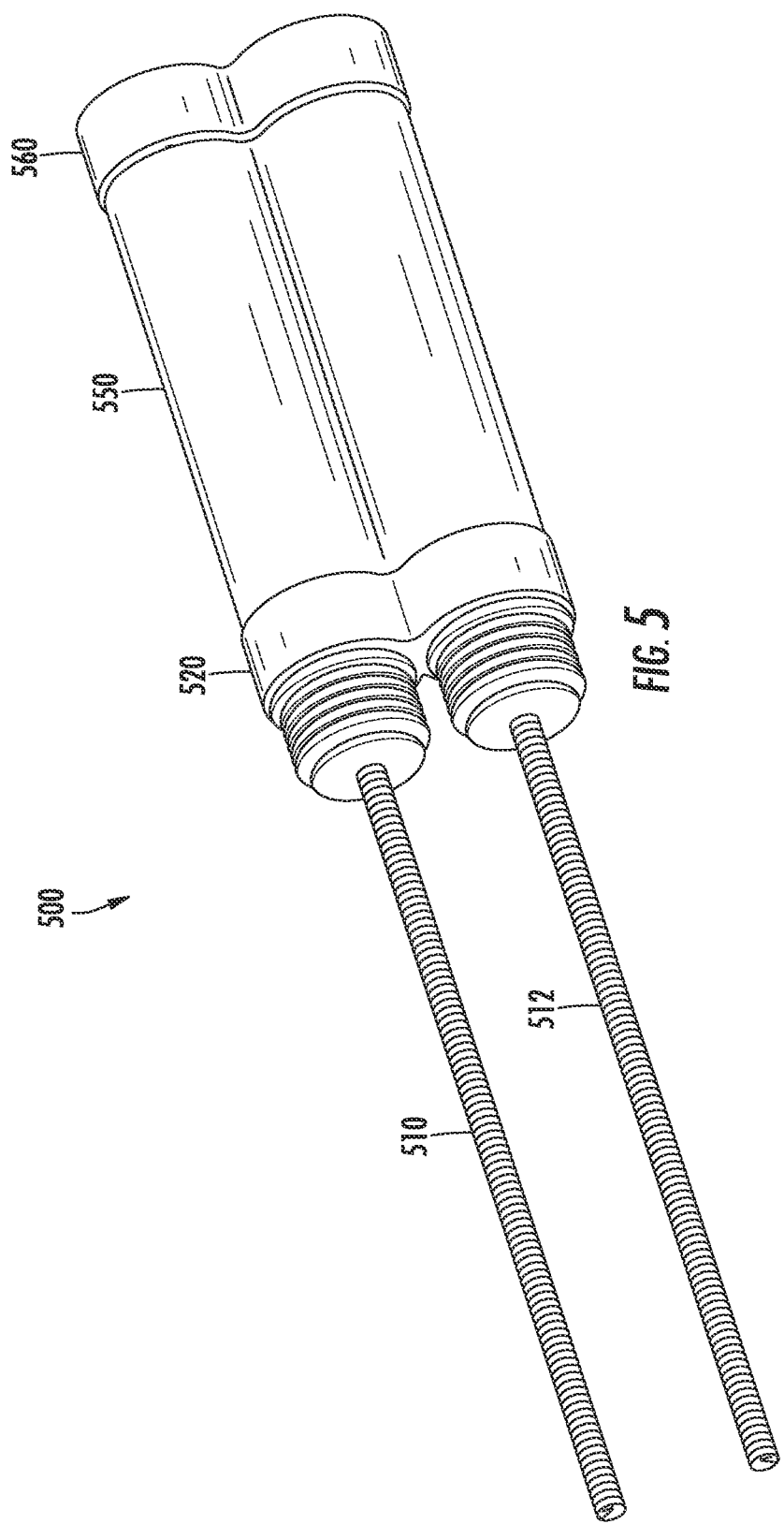
FIG. 5 is a perspective view of an exemplary dual actuator assembly in accordance with one embodiment of the present disclosure.

FIG. 5 illustrates a dual SMA actuator assembly 500 in accordance with the principles of the present disclosure. The dual SMA actuator assembly illustrated includes a dual actuator tubular body 550 which houses two (2) of the chassis assemblies such as that shown in, for example, FIGS. 1 and 4. The dual SMA actuator assembly also includes a dual actuator end cap 560 along with a dual actuator threaded end cap 520. Accordingly, in one configuration, the top threaded rod 510 may be used for push-based actuation, and the bottom threaded rod 512 used for pull-based actuation. In this manner, the actuator assembly 500 can actuate in two (2) different directions. Alternatively, the top and bottom threaded rods 510, 512 may actuate in the same direction; i.e., be both pull-based or alternatively both push-based with regards to actuation. Accordingly, the applied stroke force for the actuator assembly 500 will effectively be doubled assuming the units are energized simultaneously. Furthermore, three (3) or more threaded rods could be implemented in an alternative embodiment (not shown) which permits additional flexibility or permutations to those alternatives discussed above.

While a customized tubular body 550 and end caps 520, 560 are shown in FIG. 5, it is envisioned that the tubular body 150 and end caps 160, 120 of FIG. 1 may alternatively held together via a bracket, etc. (not shown) so that the dual actuator functionality discussed with regards to FIG. 5 can be implemented without necessitating any customized parts (with the exception of the aforementioned bracket) outside those components illustrated in FIG. 1.

Moreover, it will be recognized that the two (or more) actuators in the tandem configuration may be oriented in reverse or alternating fashion; e.g., one having its rod projecting out one end of the assembly, and one with its rod projecting out the other end.

Figure 6:
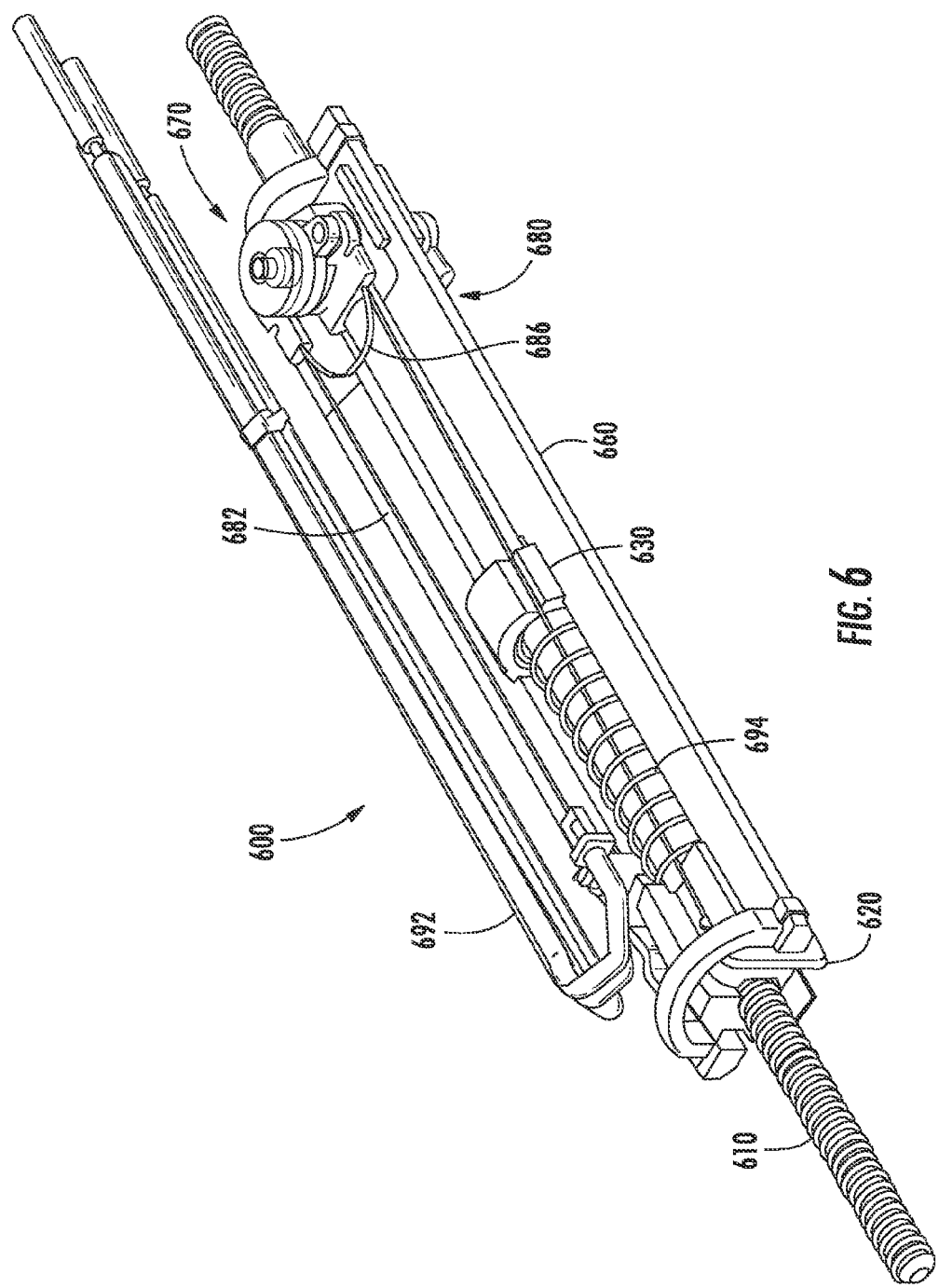
FIG. 6 is a perspective view of an alternative configuration of an actuator assembly in accordance with another embodiment of the present disclosure.

Referring now to FIG. 6, an alternative embodiment of an actuator assembly 600 is shown and described in detail. As illustrated, the actuator 600 comprises a chassis 660 that houses various elements of the actuator assembly. The elements housed within the chassis generally comprise those which ultimately provide the actuating movement for the assembly, as will be described in more detail subsequently herein. The internal components that provide the actuator-inducted movement include the driver element 620 along with the pivot assembly 670, which in combination with the filament wires 680, 682, 684 (see FIG. 6A) are utilized to actuate the shaft 610. In addition, a compression spring 694 is used to aid in returning the actuator assembly to its original state prior to actuation. In the illustrated embodiment, the compression spring is sandwiched between the driver element and the spacer element 630, with the distance between the driver element and spacer element defining the non-actuated compression spring length.

When an electrical current is provided via the terminals 692, this electrical current is transferred to the upper SMA filament 682 resulting in the heating of the upper SMA filament and SMA filament contraction, thereby pivoting the pivot shuttle 676 in a counter clock-wise direction (from the perspective illustrated in FIG. 6). Electrical current is also provided to the lower SMA filament (not shown), which also results in heating and SMA contraction. This resulting pivot also causes the SMA loop filament 680 to pull the driver element 620 thereby actuating the threaded rod. In addition, because the pivot assembly 670 includes portions made of a conductive material, it also simultaneously causes a current to flow through the loop filament 680. Alternatively, or in addition to current transfer through the pivot assembly, current also is passed to the loop filament via the jumper filaments 686. The loop filament is thus similarly heated, resulting in SMA contraction and thereby further actuating the driver element towards the pivot assembly. Accordingly, the amount of travel obtained by SMA actuation is not only the amount of contraction seen in both the upper and lower SMA filaments, but the added actuation distance obtained by the mechanical advantage provided by the pivot assembly. Increasing the actuator stroke length is often desirable, in that the increased total stroke permits a wider array of actuator end applications for the actuator assembly 600. In the illustrated embodiment, approximately 1.2 lb-f is required to initiate movement of the threaded shaft 610.

Referring now to FIG. 6A, the actuator assembly is illustrated with the chassis, terminals, and pivot assembly removed from view so that other features of the actuator assembly are more readily visible. For example, it can now be clearly seen that the driver element 620 of this embodiment includes a guide slot 622 which facilitates lateral movement along the chassis, as well as a filament routing channel 624 used for routing the loop filament 680 around the front portion of the driver element. In addition, it can also now clearly be seen that the spacer element 630 also includes a respective slot 632 configured to be positioned in cooperation with a corresponding feature on the chassis. The filament assembly 681 includes a loop filament 680 that starts and ends at the same end of the actuator assembly. The filament assembly also includes upper 682 and lower 684 straight line filaments that are electrically coupled to the loop filament via jumper filaments 686. These jumper filaments are utilized to facilitate the transmission of electrical current between the straight line filaments 682, 684 and the loop filament 680.

The actuating movement of the shaft, as discussed previously herein, is driven by an electrical power source connected to conductive terminals 692. These conductive terminals are electrically coupled to the filaments. The driver element 620 is in turn coupled to the lower filament 680 with the lower filament being in electrical communication with the upper filament via the conductive pivot shuttle 676 (see FIG. 6B). The filament wires 680, 682 are adapted to, upon thermal activation, change physical shape. This is accomplished via the use of a shape memory alloy (SMA) material for the filaments. These SMA alloys include, for instance, nickel-titanium ("NiTi" or "Nitinol") alloys, copper-zinc-aluminum alloys, etc. Depending on the type of material used, the SMA filaments used in the illustrated embodiments may have varying degrees of "memory" as discussed previously herein. A tensile stress must therefore be applied in such cases if the material is required to regain its full original length; this is accomplished by way of a spring 694 in the illustrated embodiment. Such alloys are well known to those of ordinary skill, and accordingly are not described further herein.

Figure 6B:
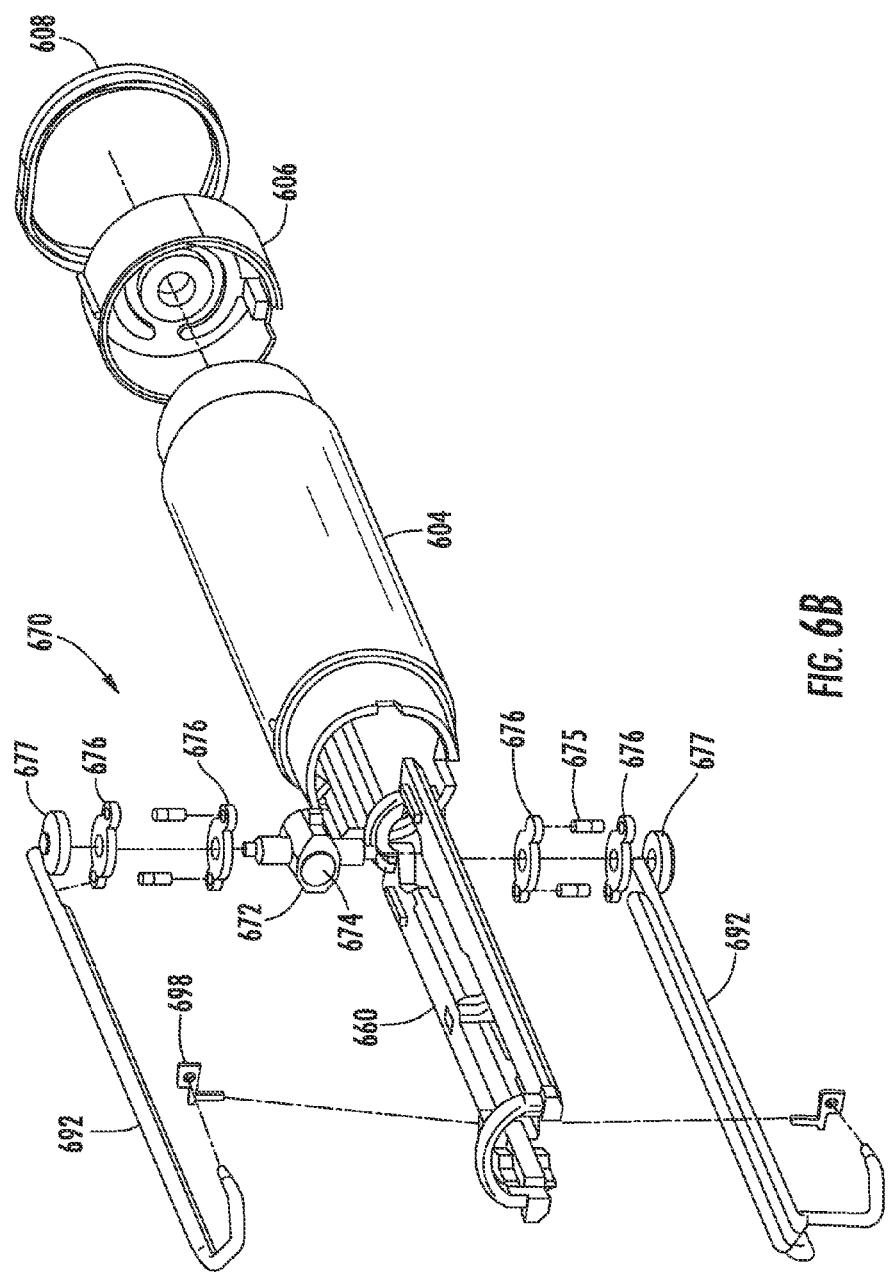
FIG. 6B is a perspective exploded view of the frame and pivot assembly portions of the actuator assembly illustrated in FIG. 6.

In addition, it can also be seen that each of the ends of the respective filaments in the filament assembly have crimping elements 690 secured thereto. These filament crimping elements include crimp features (such as, e.g., those described in co-owned U.S. Pat. No. 7,650,914, previously incorporated herein). In addition, the crimping elements also include a hoop feature 696 that is configured to fit around respective features on the pivot shuttle (FIG. 6B) and terminal clip 698 (FIG. 6B). The shaft 610 also includes a polished portion 612 that facilitates actuation movement by reducing the amount of friction between the shaft and respective features on the spacer 630 and the through-hole 674 located on the trunnion 672 (FIG. 6B). These features are positioned in a housing, which includes a housing cap 602 as shown in FIG. 6A.

Referring now to FIG. 6B, a more detailed view of, inter alia, the pivot assembly 670 is shown and descried in detail. The pivot assembly is formed from a trunnion 672 that has a through-hole 674 formed therein. The through-hole is sized so that the polished surface of the threaded shaft (not shown) can freely travel therein during actuation. The trunnion acts as a pivot point or fulcrum for the pivot shuttles 676 that gives the actuator assembly its mechanical advantage. The trunnion includes both an upper and a lower pivot shuttle assembly. Each pivot shuttle assembly includes two (2) shuttles 676 that are joined via star pins 675. These star pins are sized so that they can be received within the apertures 696 of the filament crimping elements 690. These filament crimping elements are thus sandwiched between adjacent shuttles 676. The pivot shuttle assembly also includes a pivot cap 677 that helps position the pivot shuttle assembly within the body 604.

The body 604 houses and protects the actuating components of the actuator assembly, and is closed on the ends by end cap 606 and threaded end cap (602, FIG. 6A). The external structure of the actuator assembly also includes a rubber band 608 or other such mechanism which is used for securing the terminals to the body of the actuator assembly. Electrical terminals 692 provide the electrical current necessary to provide power to the actuator assembly. The electrical power provided via the electrical terminals may be provided from any number of conventional means, including low power alternative power sources (e.g. photovoltaics).

It is appreciated that the SMA filaments illustrated in the actuator assembly of FIGS. 6-6B may be of varied or uniform thickness, as previously discussed with respect to the embodiment of FIG. 1. The thickness of SMA filaments is determinative of the force associated with the filament's change in length, and with the length of time (latency) and amount of energy necessary to cause the change in the filament's length. Therefore, it is appreciated that a plurality of configurations having different number and diameter of filaments 680, 682 may be utilized consistent with the present disclosure to provide various desirable effects. For instance, in one variant, a plurality of small filaments disposed substantially in parallel are used to provide both low latency and high pull force. In another variant, a number of different filaments with different thicknesses are used in parallel, thereby giving a distribution of force and latency. The time and/or level of applied current can also be adjusted so as to create the desired force/time profile.

Referring now to FIGS. 6C and 6D, two (2) differing configurations of the actuator assembly 600 are shown. FIG. 6C illustrates the actuator assembly of FIGS. 6-6B in a "pulling" configuration, with the threaded end cap 602 positioned at the opposite end of the pivot assembly. FIG. 6C also illustrates an exemplary positioning of the rubber band 608 so that it retains the terminals 692 next to the body 604. FIG. 6D illustrates the actuator assembly in a "pushing" configuration, with the threaded end cap 602 now positioned on the same side of the body as the pivot assembly. Herein lies a salient advantage of the illustrated actuator assembly of FIGS. 6-6D, namely its ability to be used in both "pull" and "push" configurations while using identical components.

Figure 7A:
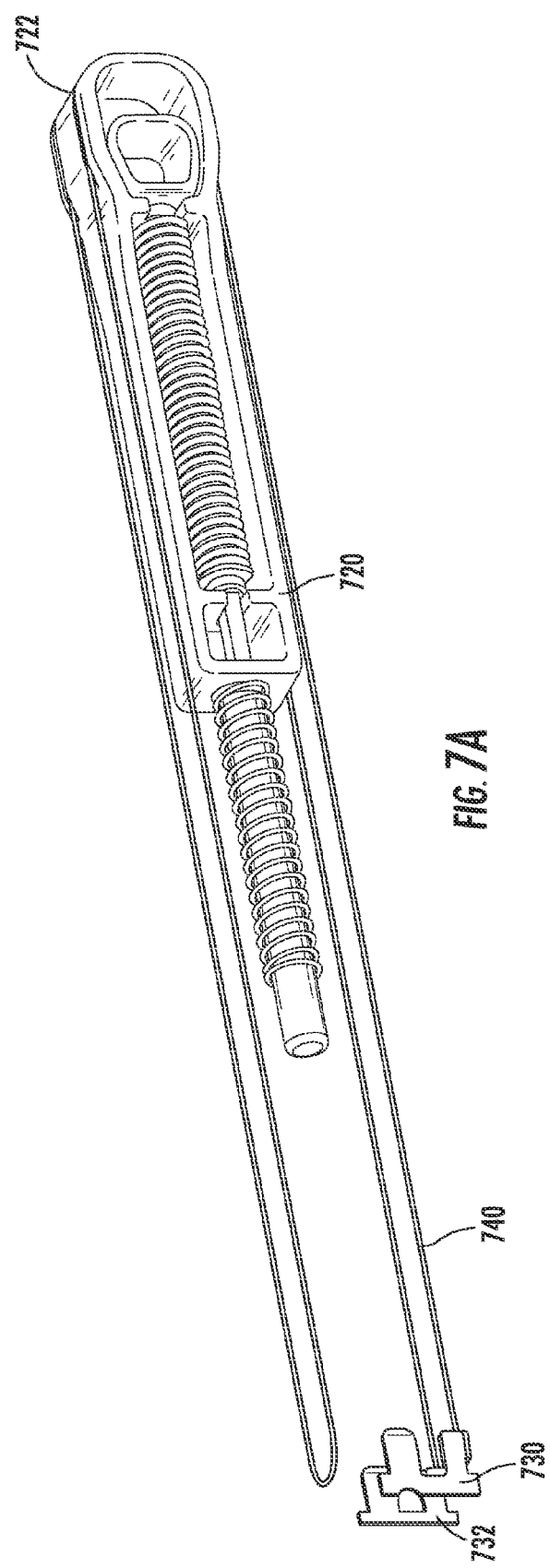
FIG. 7A is a perspective view of the actuator assembly of FIG. 7 with the housing removed from view.

FIG. 7 illustrates an alternative SMA actuator assembly 700 with an SMA protection apparatus installed therein. The SMA actuator assembly illustrated in FIG. 7 is positioned within a housing 710 that has two (2) housing mounts 712 (see also FIG. 8). However, it is appreciated that SMA protection apparatus described herein could be used in a wide variety of actuator assembly configurations, such as that described with respect to FIGS. 1, and 3-6, with the configuration shown in FIG. 7 merely being illustrative. The actuator assembly of FIG. 7 includes a driver element 720 that is coupled with an end element 714. The driver element is in turn actuated by the contraction of the SMA filament 740 that is connected to powered terminals 730, 732 (FIG. 7A). FIG. 7A illustrates the SMA actuator assembly with the housing removed from view, so that the internal components of the actuator assembly are more readily visible. Specifically, the serpentine routing of the SMA filament 740 with its ends connected to the first 730 and second terminals 732 is now readily visible. In addition, the routing of the SMA filament around the ends of the driver element within the routing channels 722 can now be seen.

Figure 7B:
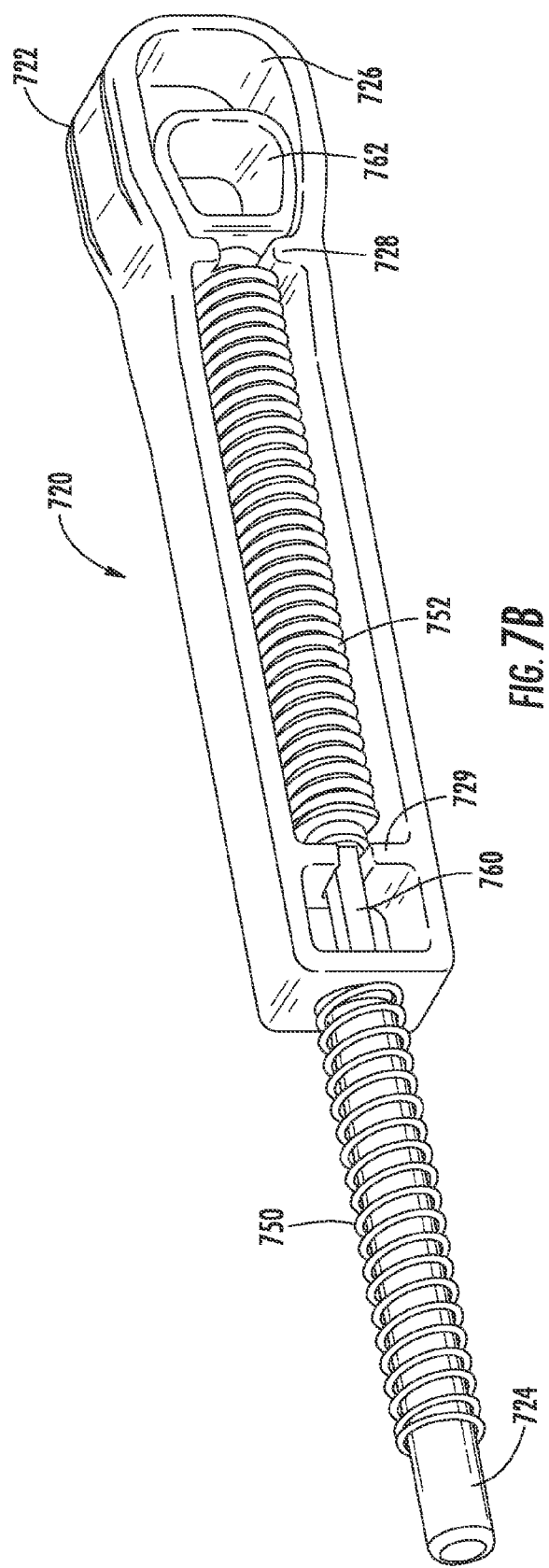
FIG. 7B is a perspective view of the driver element with accompanying SMA filament protection feature for the actuator assembly of FIG. 7.

Referring now to FIG. 7B, an exemplary embodiment of the SMA protection apparatus that protects the SMA filament from breaking during actuation and the operation thereof is shown and described in detail. The driver element 720 consists of a primary shaft 724 and a secondary shaft 760 that has a primary compression spring 750 and a secondary compression spring 752 associated with the primary and secondary shafts, respectively. The driver element includes an actuator element 762 that receives the element to be actuated. During operation, the SMA filament is heated which causes the filament to contract. The contraction of the SMA filament causes the driver element to actuate along the primary shaft 724, thereby causing the primary compression spring 750 to compress. However, in certain instances (e.g. icing, binding, etc.), the element (e.g. offset actuator element 852, FIG. 8) received within the actuator element cavity 762 can become stuck, which can place a significant amount of stress on the SMA filament.

The secondary shaft 760 and secondary compression spring 752 are configured to prevent the SMA filament from breaking during these instances where the element coupled to the driver element becomes stuck. Specifically, during instances where the element to be actuated can not move (or requires an excessive amount of force to move), the actuator element 762 will move freely within the driver element cavity 726. During normal operation, the actuator element is held against the first stop element 728 by the secondary compression spring which is held in tension between the first stop element and the second stop element 729. In the exemplary illustrated configuration, the spring constant associated with the secondary compression spring governs the amount of force required to enable the SMA protection apparatus to be actuated to protect the filament. As the amount of force required to move the element to be actuated exceeds the amount of force required to compress the secondary compression spring, the actuator element 762 moves relative to the movement associated with the driver element, thereby protecting the SMA filament from stresses that can result in damage to or even complete failure of the SMA filament.

Referring now to FIG. 8, an exemplary ice dispenser apparatus 800 for use with, for example, the actuation apparatus 700 of FIGS. 7-7B is shown and described in detail. The ice dispenser apparatus includes a base 840, and a lid 830 that opens by rotating about the rotational axis 810. The actuating element 850 of the lid includes an offset actuator element 852 that, when driven by the actuation apparatus 700, causes the lid to open. The primary compression spring (750, FIG. 7B) then causes the lid to close upon the removal of electric current from the SMA filament in the actuation apparatus. The exemplary ice dispenser apparatus also includes a steel button 820 configured to operate in conjunction with a button magnet 822. In the illustrated embodiment, the button magnet is positioned on or within the lid, while the steel button is positioned inside the base of the ice dispenser apparatus, although it is appreciated that the positioning of these respective components could be reversed or otherwise adjusted or varied. Furthermore, combinations which utilize other magnetic materials, whether heterogeneous as in the present instance, or homogenous (e.g. the use of two (2) button magnets) are also envisioned with the steel/magnet button combination merely being exemplary.

The use of the steel/magnet button provides advantages over prior art configurations which utilized a torsion spring to keep the lid closed over the body of an ice dispenser apparatus. The forces exerted by a spring are proportional to the spring constant of the spring multiplied by the travel distance for the spring (F=kX). Accordingly, the farther a spring is displaced the more force that will be required in order to continue to further displacement of the spring. Such a configuration is not necessarily desirable when the actuation for the ice dispenser is being provided by an SMA filament. Magnets, on the other hand, work in an opposite manner. Specifically, the force applied by a magnet generally dissipates in an inverse squared relationship as the distance from the magnet increases. Accordingly, the actuation force of the SMA filament only needs to be strong enough to break the initial magnetic coupling force, as the force required to open the lid will dissipate rapidly as the lid separates from the base. By lowering the amount of force necessary for the SMA filament to actuate the lid, less stress is seen on the SMA filament. By lowering the amount of stress seen by the SMA filament, the amount of cycles that can be expected for a given SMA filament will increase, resulting in among other things a longer product life. In an exemplary embodiment, a prior art ice dispenser with a torsion spring requires 4.4 lbf (pounds-force) in order to fully open lid. However, using the configuration illustrated in, for example, FIG. 8 only necessitates a minimal force (0.35 lbf) in order to open the lid of the ice dispenser apparatus.

Figure 9:
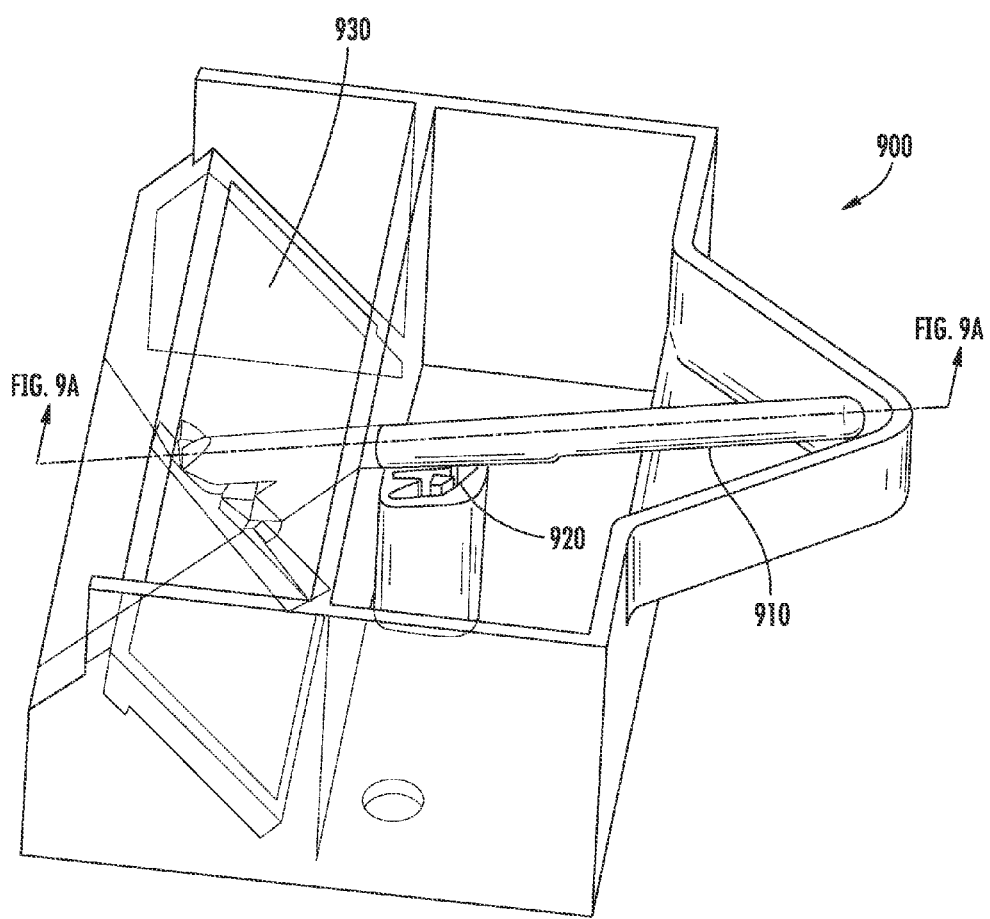
FIG. 9 is a perspective view of an exemplary refrigerator vent apparatus that utilizes an SMA actuated rod in accordance with the principles of the present disclosure.

Referring now to FIG. 9, a refrigerator vent apparatus 900 that utilizes an SMA actuated rod 910 in order to open (and close) the refrigerator vent 930 is shown and described in detail. The SMA filament (not shown) in the illustrated in FIG. 9 actuates a dual action cam 920 that in turn opens a refrigerator vent. Because of conditions within the refrigerator, the vent can periodically stick due to ice buildup, often requiring much more force to initially open the vent than is otherwise required to complete the opening cycle for the vent when unimpeded. The rod illustrated in FIG. 9 advantageously reduces the amount of work required to open the vent door. In addition, the dual action heart shaped cam illustrated in FIG. 9 works to keep the door open after actuation without necessitating that the SMA filament remain energized.

Figure 9A:
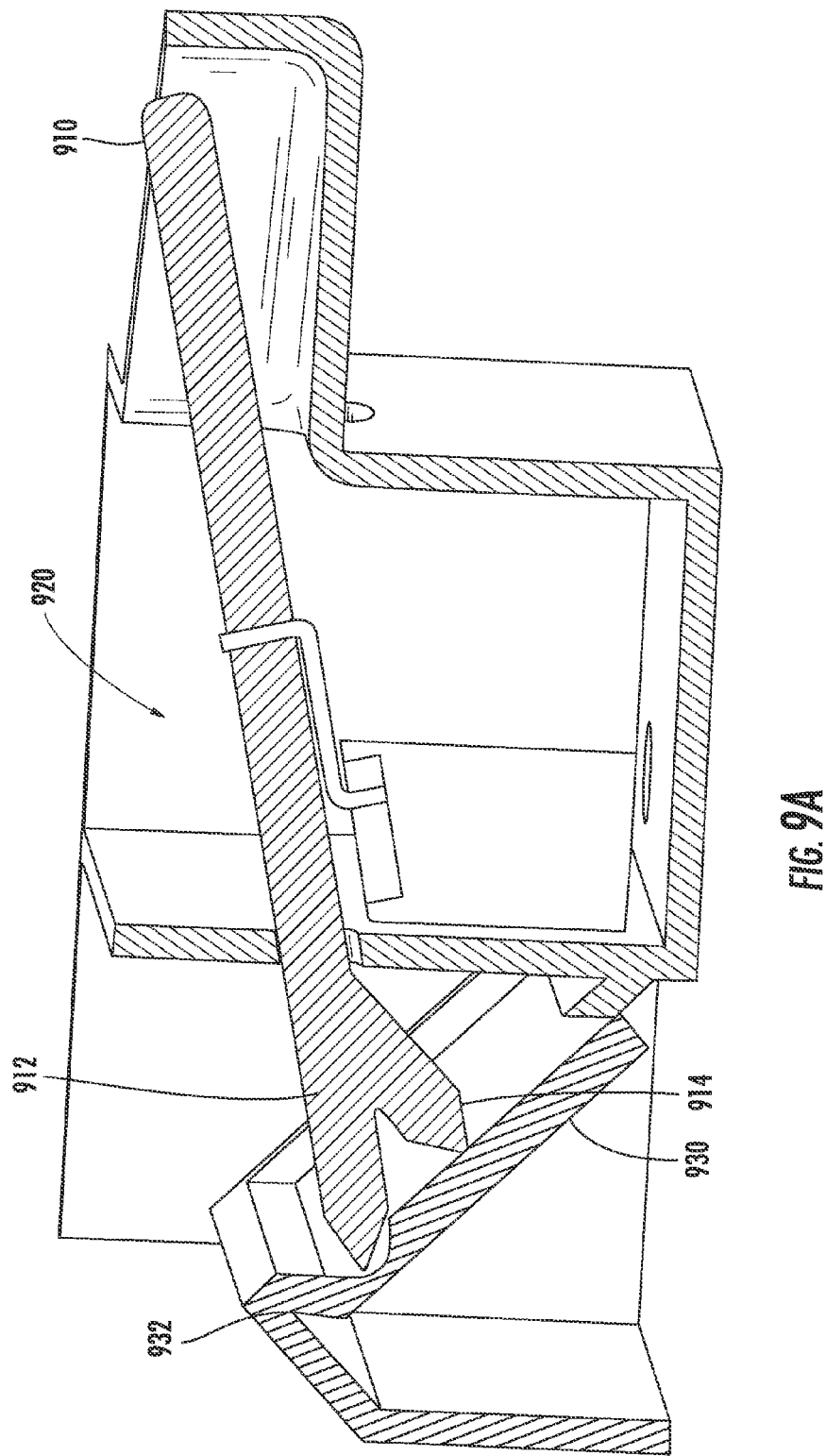
FIG. 9A is a sectional view taken along lines 9A-9A of the vent apparatus of FIG. 9.

Referring now to FIG. 9A, the operation of the SMA actuated rod 910 of FIG. 9 can better be seen. Prior to actuation, the lower finger 914 of the rod is in contact (or close proximity) with the vent door 930. The upper finger 912 of the rod is spaced further from the vent door 930 than the lower finger prior to actuation. When a current is applied to the SMA filament (not shown), the SMA filament will shrink, causing the rod to be pulled towards the vent door. The lower finger of the rod, being spaced at a farther distance from the axis of rotation 932 than the upper finger, will engage the vent door first. Because the lower finger is spaced further from the axis of rotation 932 than the upper finger, the lower finger possesses a mechanical advantage over the upper finger, allowing the rod to break any sticking that may have resulted from icing on the vent door. At a predetermined point past the point where the vent door might stick, the upper finger engages the vent door. As the upper finger is closer to the axis of rotation than the lower finger, the upper finger can open the vent further than the lower finger given the same amount of SMA filament shrinkage. In addition, because the upper finger does not engage the vent door until past the sticking point during an icing condition, the amount of force required to open the vent is significantly lower.

In addition to the specific configuration shown, it is appreciated that the SMA actuated rod could be coupled to any of the actuator embodiments illustrated in FIGS. 1, and 3-6. Furthermore, such an embodiment can also incorporate the filament protection apparatus as illustrated in FIGS. 7-7B so as to ensure that the SMA filament would not break should an excessive amount of ice build up around the refrigerator vent (thereby preventing the vent from opening). In addition, the vent door could incorporate the steel/magnet button combination illustrated and described with respect to FIG. 8 in some embodiments. These and other alternative variants would be readily apparent to one of ordinary skill given the present disclosure.

Methodologies—

Figure 10:
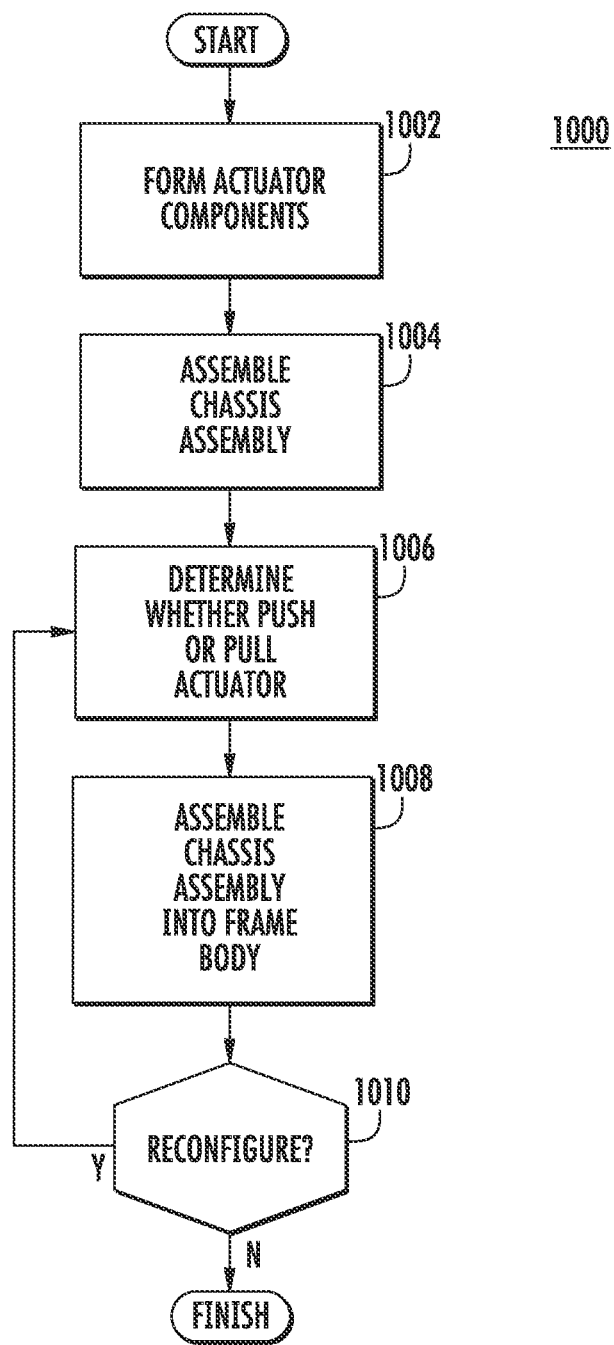
FIG. 10 is a process flow diagram of an exemplary embodiment of a method of manufacturing the actuator assemblies of FIG. 1, and FIG. 4-FIG. 6 in accordance with the disclosure.

Referring now to FIG. 10, an exemplary embodiment of a method 1000 of manufacturing an SMA actuator assembly (such as those shown in FIGS. 1 and 3-6) is shown and described in detail.

At step 1002, the actuator components for use in the actuator assembly are formed. The components may be formed from any number of suitable manufacturing methodologies that would be readily apparent to one of ordinary skill given the present disclosure. For example, and with respect to the embodiment of FIG. 1, the tubular body 150 and end caps 120, 160 are in one implementation manufactured from a suitable polymer (plastic) material using standard injection molding techniques. Alternatively, the injection molded process could be substituted with a die-cast process, or use of a machined metal component. Similarly, many of the components used in the chassis assembly are also, in an exemplary embodiment, manufactured from a polymer based material using an injection molding process. For example, the chassis 140, trunnion element 170 and driver element 130 are all well suited for the injection molding process, which reduces cost and maintains low component weight for comparatively high strength.

The filament securing elements 190 and electrical terminals 192 are preferably manufactured using standard progressive stamping manufacturing dies in order to minimize costs in volume production, while the internal spring 194, threaded rod 110 and SMA filament wire 180 are manufactured using well-known methodologies appreciated by those of ordinary skill given the present disclosure.

At step 1004, the chassis assembly 102 is assembled by crimping the SMA filament 180 to respective ends of the filament securing elements 190. The trunnion element 170 is inserted into its respective receptacle feature on the chassis 140. The driver element and spring 194 are also inserted into the chassis, and the SMA filament 180 is subsequently routed around the driver element and trunnion element, respectively, in order to provide the mechanism for actuations. The filament securing elements 190 in combination with the electrical terminals 192 are then inserted into the chassis to complete the chassis assembly.

At step 1006, it is determined whether the chassis assembly that was assembled in step 1004 will be utilized as either a push-based or pull-based actuator. Subsequently, at step 1008, the chassis assembly is inserted into the body 150 consistent with the decision made at step 1006. The end caps 120, 160 and the threaded rod 110 are then disposed on the tubular body in a manner consistent with the decision reached at step 1006.

At step 1010, the decision to reconfigure the SMA actuator assembly is made. If it is to be reconfigured, then the opposite actuator configuration to that previously chosen is selected at step 1006 and the actuator assembly is subsequently disassembled and re-assembled into the reconfigured SMA actuator assembly configuration. If not, then the SMA actuator assembly is installed and utilized in its end application.

It can be appreciated that while certain aspects of the disclosure have been described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claims herein.

While the above detailed description has shown, described, and pointed out novel features of the disclosure as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles of the disclosure.

What is claimed is:

1. A shape memory alloy (SMA) actuator assembly, the SMA actuator assembly comprising:
   one or more SMA filaments, the one or more SMA filaments being electrically coupled with respective ones of a plurality of terminals;
   a driver element configured to move when power is applied to at least one of the one or more SMA filaments;
   a pivot assembly, which in combination with the one or more SMA filaments, is configured to actuate the driver element; and
   a housing assembly configured to house the one or more SMA filaments, the driver element, and the pivot assembly, the housing assembly comprising a body portion and end cap portions;
   wherein the end cap portions are configured to be swapped on either end of the body portion, thereby enabling the configuration of the SMA actuator assembly from a pull-based configuration to a push-based configuration.

2. The SMA actuator assembly of claim 1, further comprising a chassis, the plurality of terminals and the pivot assembly configured to be received within the chassis.

3. The SMA actuator assembly of claim 2, further comprising a shaft, the shaft being configured to be received within the driver element.

4. The SMA actuator assembly of claim 3, further comprising a compression spring, the compression spring configured to return the driver element into a non-actuated position when power is removed from the one or more SMA filaments.

5. The SMA actuator assembly of claim 4, wherein the pivot assembly further comprises:
   a trunnion configured to act as a pivot point for one or more pivot shuttles; and
   wherein at least a portion of the one or more SMA filaments is configured to be coupled to the trunnion via the one or more pivot shuttles.

6. The SMA actuator assembly of claim 5; wherein the shaft is configured to freely move through an aperture located in the trunnion.

7. A shape memory alloy (SMA) actuator assembly, the SMA actuator assembly comprising:
   one or more SMA filaments, the one or more SMA filaments being electrically coupled with respective ones of a plurality of terminals;
   a pivot assembly, which in combination with the one or more SMA filaments, is configured to actuate a driver element, the driver element further comprising a filament routing channel, the filament routing channel used for the routing of a portion of the one or more SMA filaments;

a rod coupled with the driver element, the rod further configured to be received within an aperture located on the pivot assembly; and a chassis configured to house the pivot assembly therein, the pivot assembly configured to rotate in either of two directions within the chassis.

8. The SMA actuator assembly of claim 7, further comprising:

a compression spring; and a spacer element;

wherein the compression spring is disposed between the spacer element and an end portion of the chassis and the compression spring is further disposed about the rod that is coupled with the driver element.

9. The SMA actuator assembly of claim 8, wherein the compression spring is further configured to return the driver element into a non-actuated position when power is removed from the one or more SMA filaments.

10. The SMA actuator assembly of claim 7, wherein the one or more SMA filaments comprises a loop filament, an upper filament, a lower filament and one or more jumper filaments.

11. The SMA actuator assembly of claim 10, wherein the portion of the one or more SMA filaments routed in the filament routing channel comprises the loop filament.

12. The SMA actuator assembly of claim 10, wherein ends associated with the one or more jumper elements are configured to be coupled to the pivot assembly.

13. The SMA actuator assembly of claim 10, wherein the upper filament and the lower filament each comprise two ends, with one end of the respective upper or lower filament being coupled to the pivot assembly and with the other end of the respective upper or lower filament being coupled to a respective terminal of the plurality of terminals.

14. The SMA actuator assembly of claim 7, further comprising a housing assembly configured to house the one or more SMA filaments, the driver element, the pivot assembly and the chassis.

15. The SMA actuator assembly of claim 14, wherein the housing assembly comprises a body portion and end cap portions.

16. The SMA actuator assembly of claim 15, wherein the end cap portions are configured to be swapped on either end of the body portion, thereby enabling the configuration of the SMA actuator assembly from a pull-based configuration to a push-based configuration.

17. A shape memory alloy (SMA) actuator assembly, the SMA actuator assembly comprising:

a plurality of SMA filaments, the SMA filaments being electrically coupled with respective ones of a plurality of terminals, the plurality of SMA filaments comprising a loop filament, an upper filament, a lower filament and one or more jumper filaments;

a pivot assembly, which in combination with the plurality of SMA filaments, is configured to actuate a driver element, the driver element further comprising a guide feature configured to facilitate lateral movement along a chassis, the driver element further comprising a routing channel configured to route at least one of the plurality of SMA filaments around a portion of the driver element; and the chassis configured to house the pivot assembly therein, the pivot assembly configured to rotate within the chassis.

18. The SMA actuator assembly of claim 17, wherein the at least one of the plurality of SMA filaments routed around the portion of the driver element comprises the loop filament.

19. The SMA actuator assembly of claim 18, wherein ends associated with the one or more jumper elements are configured to be coupled to the pivot assembly.

20. The SMA actuator assembly of claim 19, wherein the upper filament and the lower filament each comprise two ends, with one end of the respective upper or lower filament being coupled to the pivot assembly and with the other end of the respective upper or lower filament being coupled to a respective terminal of the plurality of terminals.

\* \* \* \* \*